(12) United States Patent
Vuylsteke

(10) Patent No.: US 7,155,044 B2
(45) Date of Patent: Dec. 26, 2006

(54) MULTISCALE GRADATION PROCESSING METHOD

(76) Inventor: Pieter Vuylsteke, c/o Agfa-Gevaert, Septestraat 27, Mortsel (BE) B-2640

(*) Notice: Subject to any disclaimer, the term of this patent is extended or adjusted under 35 U.S.C. 154(b) by 738 days.

(21) Appl. No.: 10/366,137

(22) Filed: Feb. 13, 2003

(65) Prior Publication Data
US 2003/0161519 A1  Aug. 28, 2003

Related U.S. Application Data

(60) Provisional application No. 60/416,652, filed on Oct. 7, 2002.

(30) Foreign Application Priority Data
Feb. 22, 2002  (EP) .................................. 02100181

(51) Int. Cl.
*G06K 9/00* (2006.01)
(52) U.S. Cl. ...................... 382/128; 382/274
(58) Field of Classification Search ............. 382/128, 382/129, 130, 131, 132–134, 254, 263, 266, 382/274; 600/4, 431, 477, 458; 378/46, 378/90, 92, 98.4, 98.6, 98.9, 101, 140
See application file for complete search history.

(56) References Cited

U.S. PATENT DOCUMENTS

| 4,939,758 A | * | 7/1990 | Nowak ......................... 378/22 |
| 5,151,947 A | * | 9/1992 | Nagatsuka et al. .......... 382/132 |
| 5,164,993 A |  | 11/1992 | Capozzi et al. |
| 5,490,197 A | * | 2/1996 | Albert et al. ................ 378/113 |
| 5,617,313 A |  | 4/1997 | Namiki |
| 5,960,123 A | * | 9/1999 | Ito ............................. 382/274 |
| 6,694,046 B1 | * | 2/2004 | Doi et al. .................... 382/130 |

FOREIGN PATENT DOCUMENTS

EP  0 549 009 A1  6/1993

OTHER PUBLICATIONS

Search Report for EP 02 10 0181 (Jul. 10, 2002).

* cited by examiner

*Primary Examiner*—Jingge Wu
*Assistant Examiner*—Abolfazl Tabatabai
(74) *Attorney, Agent, or Firm*—Leydig, Voit & Mayer, Ltd.

(57) ABSTRACT

A method of generating a contrast enhanced version of a grey value image by applying contrast amplification to a multiscale representation of the grey value image wherein density in the contrast enhanced version as a function of grey value and contrast amplification are specified independently.

26 Claims, 9 Drawing Sheets

MULTISCALE GRADATION PROCESSING METHOD

This application claims the benefit of U.S. Provisional Patent Application No. 60/416,652 filed Oct. 7, 2002, which is hereby incorporated by reference.

FIELD OF THE INVENTION

The present invention relates to image processing of digital images. More particularly the invention relates to a method of enhancing the contrast of a grey value image such as a medical image.

BACKGROUND OF THE INVENTION

Nowadays several medical image acquisition techniques and systems exist that render a digital image representation of a medical image, e.g. a radiographic image.

One example of such a system is a computed radiography system wherein a radiation image is recorded on a temporary storage medium, more particularly a photostimulable phosphor screen. In such a system a digital image representation is obtained by scanning the screen with radiation of (a) wavelength(s) within the stimulating wavelength range of the phosphor and by detecting the light emitted by the phosphor upon stimulation.

Other examples of computed radiography systems are direct radiography systems, for example systems wherein a radiographic image is recorded in a solid-state sensor comprising a radiation sensitive layer and a layer of electronic read out circuitry.

Still another example of a computed radiography system is a system wherein a radiographic image is recorded on a conventional X-ray film and wherein that film is developed and subsequently subjected to image scanning.

Still other systems such as a tomography system may be envisaged.

The digital image representation of the medical image acquired by one of the above systems can then be used for generating a visible image on which the diagnosis can be performed. For this purpose the digital image representation is applied to a hard copy recorder or to a display device.

Commonly the digital image representation is subjected to image processing prior to hard copy recording or display.

In order to convert the digital image information optimally into a visible image on a medium on which the diagnosis is performed, a multiscale image processing method (also called multiresolution image processing method) has been developed by means of which the contrast of an image is enhanced.

According to this multiscale image processing method an image represented by an array of pixel values is processed by applying the following steps. First the original image is decomposed into a sequence of detail images at multiple scales and occasionally a residual image. Next, the pixel values of the detail images are modified by applying to these pixel values at least one nonlinear monotonically increasing odd conversion function with a gradient that gradually decreases with increasing argument values. Finally, a processed image is computed by applying a reconstruction algorithm to the residual image and the modified detail images, the reconstruction algorithm being the inverse of the above decomposition process.

The above image processing technique has been described extensively in European patent EP 527 525, the processing being referred to as MUSICA image processing (MUSICA is a registered trade name of Agfa-Gevaert N.V.).

The described method is advantageous over conventional image processing techniques such as unsharp masking etc. because it increases the visibility of subtle details in the image and because it increases the faithfulness of the image reproduction without introducing artefacts.

Prior to being applied to a hard copy recorder or to a display device the grey value image is pixelwise converted into a digital image representing density of the visible image.

The conversion of grey value pixels into density values suitable for reproduction or display comprises the selection of a relevant subrange of the grey value pixel data and the conversion of the data in this subrange according to a specific gradation function. Commonly, the gradation function is defined by means of a lookup table, which, for each grey value, stores the corresponding density value.

Preferably the relevant subrange and the gradation function to be applied are adapted to the object and to the examination type so that optimal and constant image quality can be guaranteed.

The shape of the gradation function is critical. It determines how the subintervals of the density range of the visible image are associated with subranges of grey values, in a monotonic but mostly nonlinear way.

In those intervals where the function is steep, a narrow subrange of grey values is mapped onto the available output density interval. On the other hand, in those intervals where the function has a gentle gradient, the available output density interval is shared by a wide subrange of grey values. If the gradation function has a gentle gradient in the low density half and evolves to steeper behaviour in the high density portion, then most of the grey values are mapped to low density, and the overall appearance of the result image will be bright. Reversely, if the gradation function takes off steeply, and evolves to the high density with decreasing gradient, then most of the grey values are mapped to high density, yielding a dark, greyish look.

This way, it is possible to determine how the density intervals are distributed across the range of grey values, by manipulating the shape of the gradation function. As a general rule, grey value subranges that are densely populated (i.e. peaks in the grey value histogram) should be mapped onto a wide output density interval. Reversely, intervals of grey values that occur infrequently in the image should be concentrated on narrow density intervals. This paradigm known as histogram equalization leads to enhanced differentiation of grey value regions in an image.

The density of pixels and image regions is determined by the corresponding ordinate value of the gradation function. The contrast amplification of pixels and image regions on the other hand, is determined by the corresponding derivative value (i.e. the gradient) of the gradation function. As a consequence, if the shape of the gradation function is adjusted to accommodate a large subrange of grey values within a specified density interval, i.e. if the interval has to cope with wide latitude, then at the same time the contrast in that density interval will drop. On the other hand, if a density interval is assigned to only a narrow grey value subrange, then that interval will provide enhanced contrast. If is requirements with respect to density and contrast amplification are conflicting, which is often the case, then a compromise is unavoidable.

In one embodiment of the multiscale image processing method as described in the above-mentioned European patent EP 527 525, the gradation function is applied after the reconstruction process, which is the inverse of the multiscale decomposition. The gradation function is applied to the final scale of reconstruction. As a consequence, the contrast-to-grey value relationship, which is specified by the derivative of the gradation function, is identical at all scales.

In some cases however, it is favourable to differentiate contrast adjustment depending on grey value and scale simultaneously. E.g. in chest images it is important to have high contrast in the smaller scales (i.e. fine detail contrast) at high grey values to enhance conspicuity of pneumothorax, but only moderate fine detail contrast in the low grey value areas like the mediastum. At the same time, large scale contrast in the lower and mid grey values must be appropriate to visualise e.g. pleural masses.

In some embodiments disclosed in the above-mentioned European patent application EP 527 525 scale-dependent boosting or suppression of the contribution of detail information is applied.

Two different implementations have been described.

In a first implementation the modified detail images are pixelwise multiplied by a coefficient in the last stages of the reconstruction process. The value of such a coefficient depends on the brightness of the pixels of the partially reconstructed image.

In a second implementation a partially reconstructed image is converted according to a monotonically increasing conversion function with gradually decreasing slope, for example a power function. Then the reconstruction process is continued until a full size reconstructed image is obtained. Finally the resulting image is converted according to a curve which is the inverse of the afore-mentioned conversion curve.

Although this disclosure describes scale-dependent suppression or boosting of the contribution of detail information, it does not describe the way in which an envisaged density nor contrast amplification as a function of grey value can be obtained.

OBJECTS OF THE INVENTION

It is an object of the present invention to provide a method for generating a contrast enhanced version of a grey value image that overcomes the prior art disadvantages. Further objects will become apparent from the description given below.

SUMMARY OF THE INVENTION

The above mentioned objects are realised by a method of generating a contrast enhanced version of a grey value image.

In the context of the present invention a grey value image is an image represented by grey values of its pixels. More particularly, the term grey value image may refer to the image supplied as an input to the multiscale decomposition according to the present invention, or it may refer to a complete or partial reconstruction of its multiscale representation, whether or not having been subjected to prior contrast enhancement processing.

According to the invention a contrast enhanced version of a grey value image is generated by applying contrast amplification to a multiscale representation of the grey value image. The pixels of the resulting image represent any pixel value quantity that is suited for soft- or hardcopy viewing, such as perceptually linear pixel values (so-called p-values) or optical density.

The present invention is advantageous in that density and contrast amplification can be adjusted independently so that both image characteristics can be optimized without mutual influence. This means that the density mapping can be adjusted to provide the most optimal density settings with adversely affecting at the same time the resulting contrast. This is an advantage with respect to prior art methods based on a gradation function, since any modification of the gradation function shape in order to improve the density mapping inevitably also alters the contrast rendition.

The contrast amplification in accordance with the present invention is specified at successive scales by a series of gradient functions that represent the amount of contrast amplification as a function of grey value at the corresponding scale.

In a particular embodiment, for a predefined large scale the gradient function is derived from a predefined function that specifies density as a function of grey value. According to the present invention the large-scale gradient function is the derivative of a predefined grey-value-to-density mapping function. A function that maps a range of grey values into corresponding density pixel values appropriate for hardcopy printing or softcopy viewing, is commonly known as a gradation function. Therefore, the above function that specifies density as a function of grey value from which the large-scale gradient function is derived is further on referred to as the large-scale gradation function.

The large-scale gradation function preferably has a predefined ordinate value and a predefined slope in an anchor point, the abscissa value of the anchor point being deduced from the grey value image.

Alternatively the large-scale gradation function has a predefined shape, and is stretched and shifted along the abscissa axis in order to match a relevant subrange of pixel values of the grey value image.

The large-scale gradation function can be derived from the histogram of pixel values of the grey, value image or of a large scale image obtained by applying partial reconstruction to said multiscale representation. Alternatively, the large-scale gradient function is immediately derived from the histogram.

The above-described methods of defining the large-scale gradient function are advantageous because the shape and signal range of the large-scale gradation function are deduced from the grey value image and consequently the density mapping is automatically adapted to the image.

Optionally, the large-scale gradation function derived from the histogram is further adjusted so that it has a predefined ordinate value in at least one anchor point, the abscissa of which is determined as a characteristic point of the histogram of pixel values of said grey value image. This way, one can enforce a predefined density to a specified grey value range, and at the same time provide automatic density mapping for most of the grey value range. This is advantageous if critical image regions such as the lung fields must be mapped to a predefined density.

In a particular embodiment of the present invention the gradient function for a predefined small scale is also predefined.

Preferably this gradient function for the predefined small scale has a predefined value in at least two overlapping grey value bands.

It can be expressed as a function of grey value or as a function of density.

According to a specific embodiment of the present invention the gradient functions at the scales in between said large scale and said small scale are generated in such a way that their shapes evolve gradually from the shape of the small-scale gradient function to the shape of the large-scale gradient function.

If said small scale is not the smallest of the scale range (i.e. scale 0), then the gradient functions at the scales smaller than said small scale are preferably identical to the small-scale gradient function.

Further specific features for preferred embodiments of the invention are set out in the dependent claims.

As an advantage with respect to the prior art methods for scale-dependent suppression or boosting of the contribution of detail information as disclosed in the above-mentioned European patent application EP 527 525, the present invention provides a method to simultaneously realize a prescribed density mapping and contrast amplification as a function of grey value.

The embodiments of the methods of the present invention are generally implemented in the form of a computer program product adapted to carry out the method steps of the present invention when run on a computer. The computer program product is commonly stored in a computer readable carrier medium such as a CD-ROM. Alternatively the computer program product takes the form of an electric signal and can be communicated to a user through electronic communication.

DETAILED DESCRIPTION OF THE INVENTION

Description of an Image Acquisition System

Figure 1:
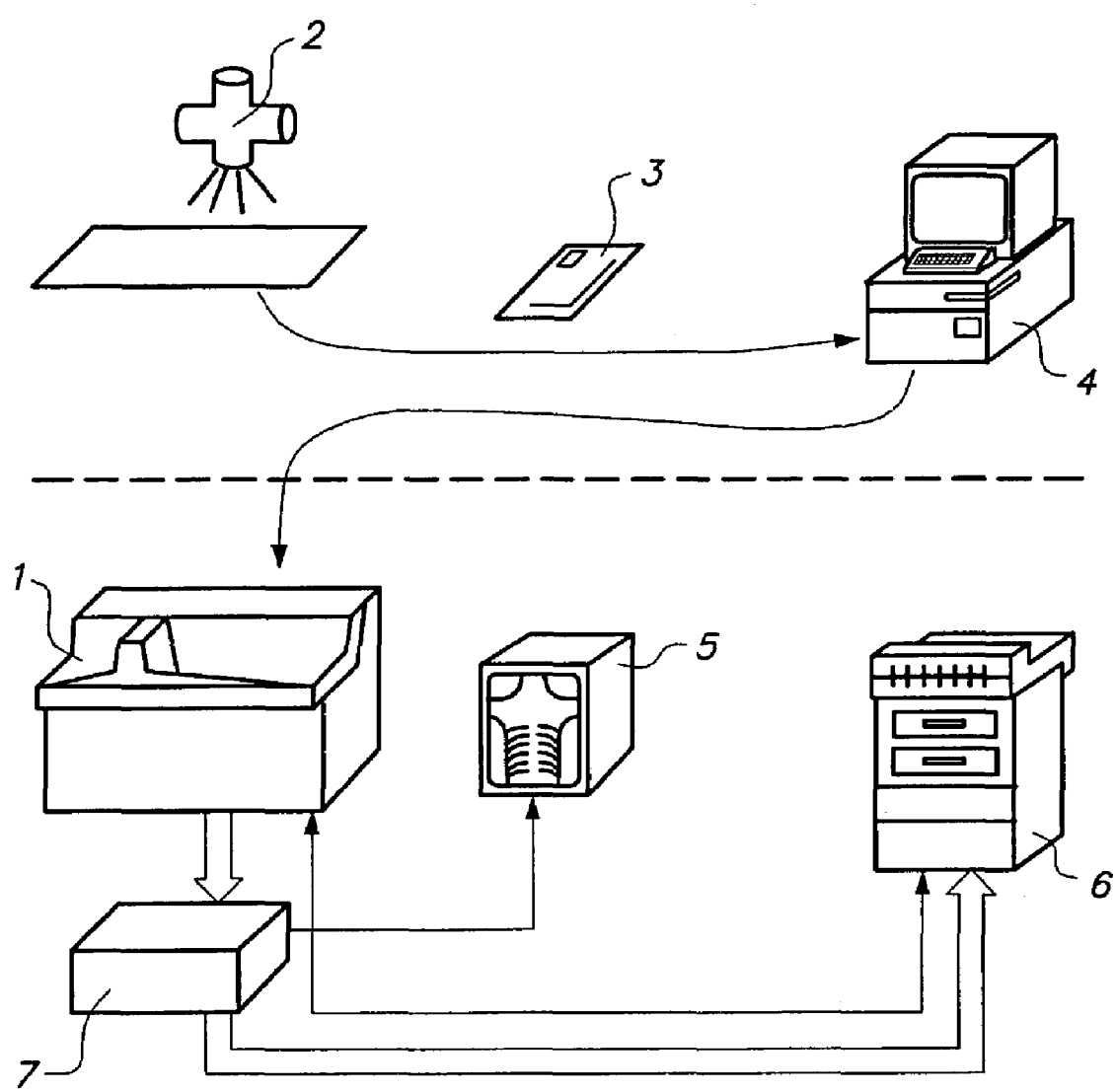
FIG. 1 shows an apparatus for acquisition of a digital image representation of a medical image, for processing the digital image and for generating an enhanced visible image.

X-rays emitted by a source of radiation (2) are transmitted by a patient (not shown) and recorded on a temporary storage medium, more particularly a photostimulable phosphor screen (3). In an identification station (4) patient identification data are written into a memory device, e.g. an EEPROM provided on a cassette carrying the photostimulable phosphor screen.

The exposed photostimulable phosphor screen is then fed into a read out apparatus (1) where a digital image representation of the stored radiation image is generated.

For this purpose the exposed screen is scanned by means of radiation having (a) wavelength(s) within the stimulation wavelength range of the photostimulable phosphor. Image-wise modulated light is emitted by the phosphor upon stimulation. This light is detected and converted by an opto-electronic converter and subsequent A-to-D converter into a digital image representation of the radiation image.

The digital image representation is applied to an image-processing module (7), which can be incorporated in the read out device or provided as a separate unit. In the image-processing module the digital image representation is subjected to different kinds of processing, among which are multiscale contrast enhancement, noise reduction and gradation processing.

Finally the processed digital image is applied to an output apparatus such as a hard copy recording device (6) or a display monitor (5) where a visible image is generated. The visible image can be used by the radiologist for making a diagnosis.

Image Chain

By means of the terms image chain, is meant the sequence of image operations and image processing control mechanisms that are applied either separately or in combination to the digital image representation for transforming the signal generated by the read out device into a processed digital image representation that can be applied to the output device.

Figure 2:
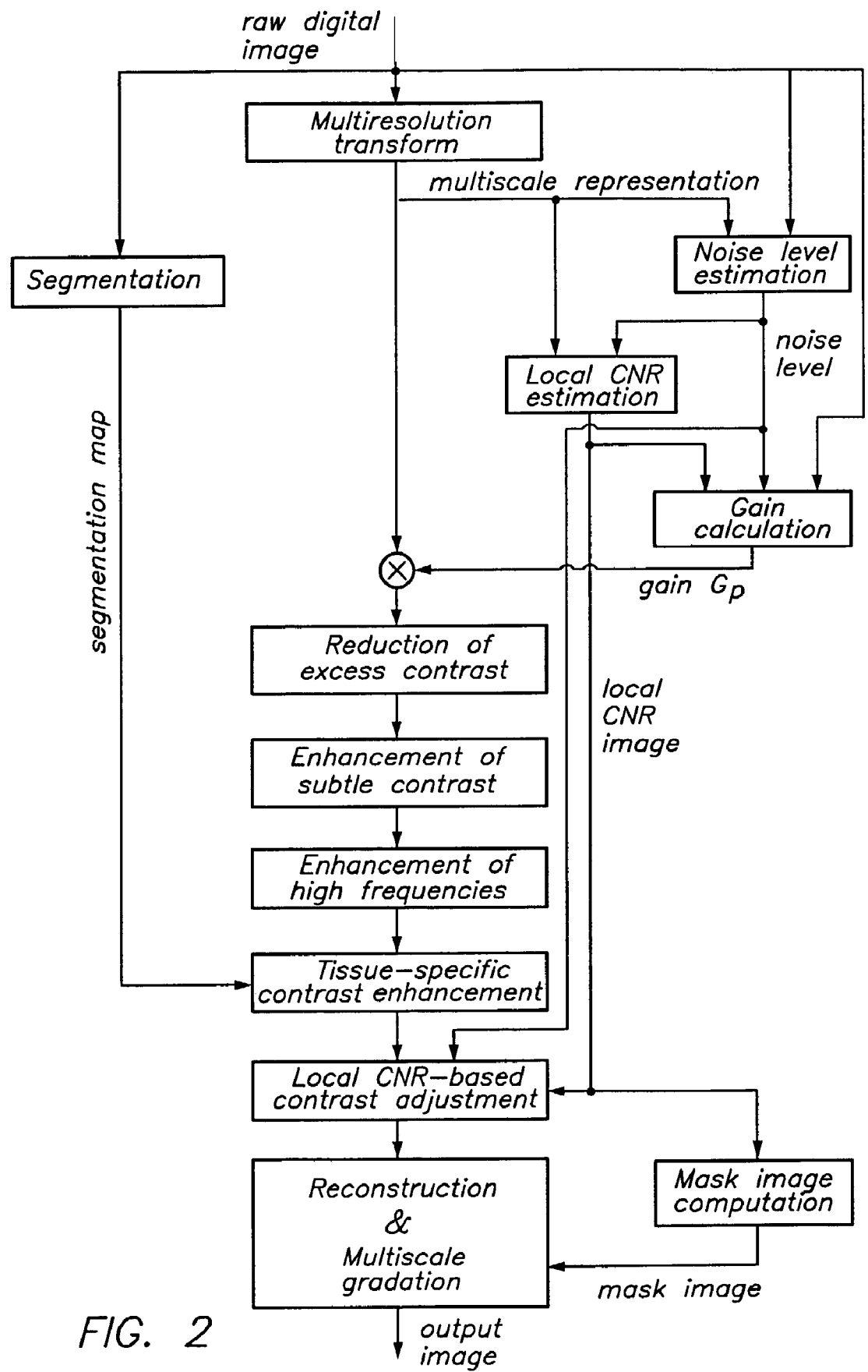
FIG. 2 is a block scheme illustrating the image chain.

A block diagram illustrating the entire image chain is illustrated in FIG. 2.

The image chain comprises the steps enumerated below.

In a preliminary step the digital signal representation of an image is subjected to a conversion according to a square root function, in order to make the pixel values proportional to the square root of the radiation dose recorded on the photostimulable phosphor screen. The resulting image is called a raw digital image.

One of the main sources of noise in the image is quantum mottle, which has a Poisson distribution. The square root conversion ensures that the noise statistics is transformed into a Gaussian distribution, with a standard deviation that is independent of dose. The latter preprocessing of the digital image is not essential, but it greatly simplifies the mathematics of the subsequent processing stages, because the noise can then be assumed roughly uniform across the raw image.

In an alternative embodiment, the square root conversion is carried out in the read out apparatus by means of an amplifier with square root characteristic. A raw digital image is generated by applying A-to-D conversion to the resulting signal.

With both embodiments, the raw digital image is used for further processing.

In a first processing step the raw digital image is decomposed into at least two detail images at successive scales and a residual image (further referred to as multiscale representation), according to a multiscale transform.

From the multiscale representation and/or the raw digital image a number of values such as noise level, gain factor, local contrast to noise ratio (CNR) estimations are derived. These values will be used in the following steps.

In the next step the multiscale representation is subjected to a normalisation procedure to cancel out disturbing fluctuations that are due to dose variations, different exposure parameters, different patient latitude etc.

This is followed by a reduction of excess contrast in the image. This step comprises a limitation of the signal range by applying a conversion function that consists of a linear and an exponential part.

The reproduction of subtle details is enhanced by means of an amplifying component that is superposed on the function for limiting the signal range.

In the following processing step the small-scale edges and textures are rendered by controlling the contrast enhancement of details as a function of the scale in the multiscale representation.

Next the image is subjected to a tissue-specific contrast enhancement. This enhancement step makes use of a segmentation map derived from the raw image.

In the subsequent step the pixels of the multiscale representation are locally attenuated or amplified depending upon local contrast-to-noise ratio, which quantity discriminates between homogeneous and non-homogeneous image regions.

Next the processed multiscale representation is subjected to a reconstruction step by applying the inverse of the decomposition transform to the modified detail images.

In the course of reconstruction, a series of scale-specific conversion functions are consecutively applied to the partially reconstructed image, in order to adjust contrast amplification as a function of both grey value and scale. The latter process will be referred to as multiscale gradation. The thus obtained pixel values are the driving values for the hard- or softcopy reproducing device, further on referred to as density values The processing applied to the image representation of the radiation image comprises a multiscale contrast enhancement. The image is first decomposed into a weighted sum of basis image components at several scales by applying a decomposition transform. The components of the multiscale representation are referred to as detail images. The pixel values of the multiscale representation correspond with the contrast of elementary image components, relative to their close neighbourhood.

This multiscale decomposition step is followed by contrast enhancement steps wherein the pixel values of the multiscale representation are amplified or weakened in order to obtain the envisaged contrast enhancement.

In the final step the modified components are recombined into a grey value image by applying the inverse of the decomposition transform. In accordance with the present invention the latter step incorporates the cascaded application of scale-specific conversion functions.

The multiscale decomposition can be performed before the normalisation step as set out in FIG. 2. Alternatively it can be performed simultaneously with or after normalisation.

The contrast enhancement steps applied to the layers of the normalised multiscale representation can be considered as a sequence of concatenated operations, i.e. the input of one operation is the output of the previous operation.

The contrast enhancing steps shown in FIG. 2 can be performed in combination. Alternatively any of the contrast enhancing steps can be left out (this will however affect the overall image quality).

1. Multiscale Transform

The raw digital image is subjected to a multiscale decomposition. The image is decomposed into at least two detail images representing detail at several successive scales.

This technique has been described extensively in EP 527 525.

The pixels of the detail images represent the amount of variation of pixel values of the original image at the scale of the detail image, whereby scale refers to spatial extent of these variations.

A residual image can also be generated which is an approximation of the original image with omission of all variations comprised in the detail images.

The detail images at subsequent scales (or resolution levels) are called multiscale layers, or simply layers.

Figure 3:
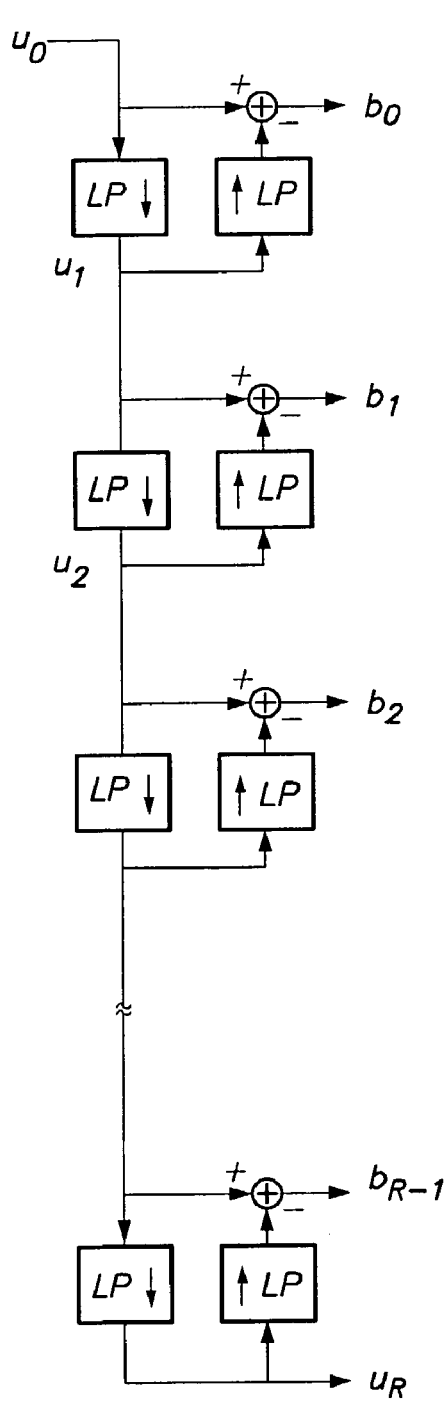
FIG. 3 illustrates a first embodiment of performing the multiscale decomposition step, according to the Burt pyramid transform.

In a first embodiment of computing a multiscale transform the detail images at successively larger scales are obtained as the result of each of R iterations of the following steps, as depicted in FIG. 3:

a) computing an approximation image $g_{k+1}$ at a next larger scale k+1 by applying a low pass filter LP to the approximation image $g_k$ corresponding to the current iteration k, and subsampling the result in proportion to the reduction in spatial frequency bandwidth, using however the original image $u_0$ as input to said low pass filter in the course of the first iteration;

b) computing a detail image $b_k$ as the pixelwise difference between the approximation image $u_k$ corresponding to the current iteration and the approximation image $u_{k+1}$ at a next larger scale computed according the method sub (a), both images being brought into register by proper interpolation (represented by [↑ LP] in the flow chart) of the latter image; wherein the residual image $u_R$ is equal to the approximation image produced by the last iteration.

Figure 4:
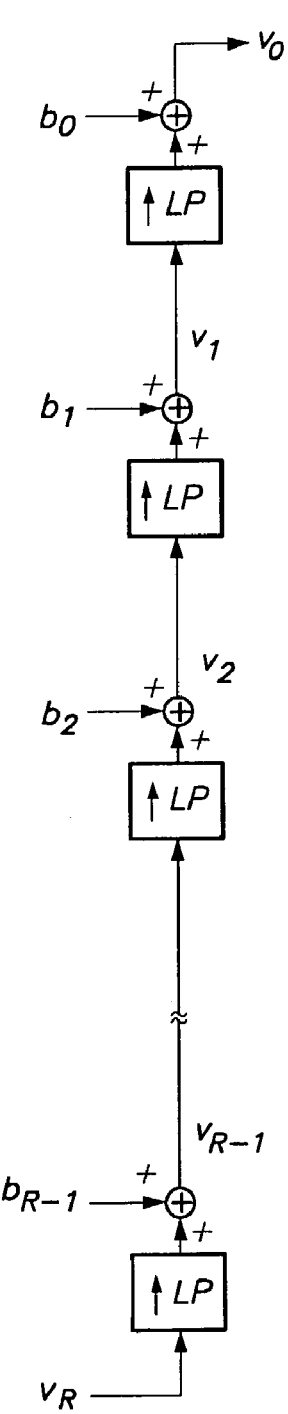
FIG. 4 illustrates the corresponding reconstruction step.

The corresponding reconstruction (which we will refer to as ordinary reconstruction, i.e. reconstruction without multiscale gradation) is done by applying the inverse transform, as depicted in FIG. 4. In the described embodiment ordinary reconstruction is implemented by iterating R times the following procedure starting from the largest scale detail image $b_{R-1}$ and the residual image $v_R = u_R$:

computing the approximation image $v_k$ at the current scale k by pixelwise adding the detail image $b_k$ at the same scale to the approximation image $v_{k+1}$ at the larger scale corresponding to the previous iteration, both images being brought into register by proper interpolation of the latter image, using however the residual image $v_R$ instead of said larger scale approximation image in the course of the first iteration.

The residual image will be a low-resolution image or in the extreme case, an image comprising only one single pixel, depending on the number of iterations in the decomposition.

The latter combination of forward and inverse multiscale transform is commonly known as the Burt pyramid transform.

In an alternative embodiment the image is decomposed into a weighted sum of predetermined basic detail images at multiple scales and occasionally a residual basic image by applying a transform to the image, the transform yielding a set of detail coefficients each expressing the relative contribution to the original image of one of a set of basis functions representing these basic detail images and occasionally a residual coefficient representing the relative contribution to the original image of a basis function representing the basic residual image.

The basis functions are continuous and non-periodic and have zero mean value except for the basis function that represents the basic residual image. An example of such basis functions are wavelets.

The transform is such that there exists an inverse transform which returns the original image or a close approximation thereof when being applied to the transform coefficients.

The image can be reconstructed by applying the inverse transform to the detail coefficients and the residual coefficient if generated.

Figure 6:
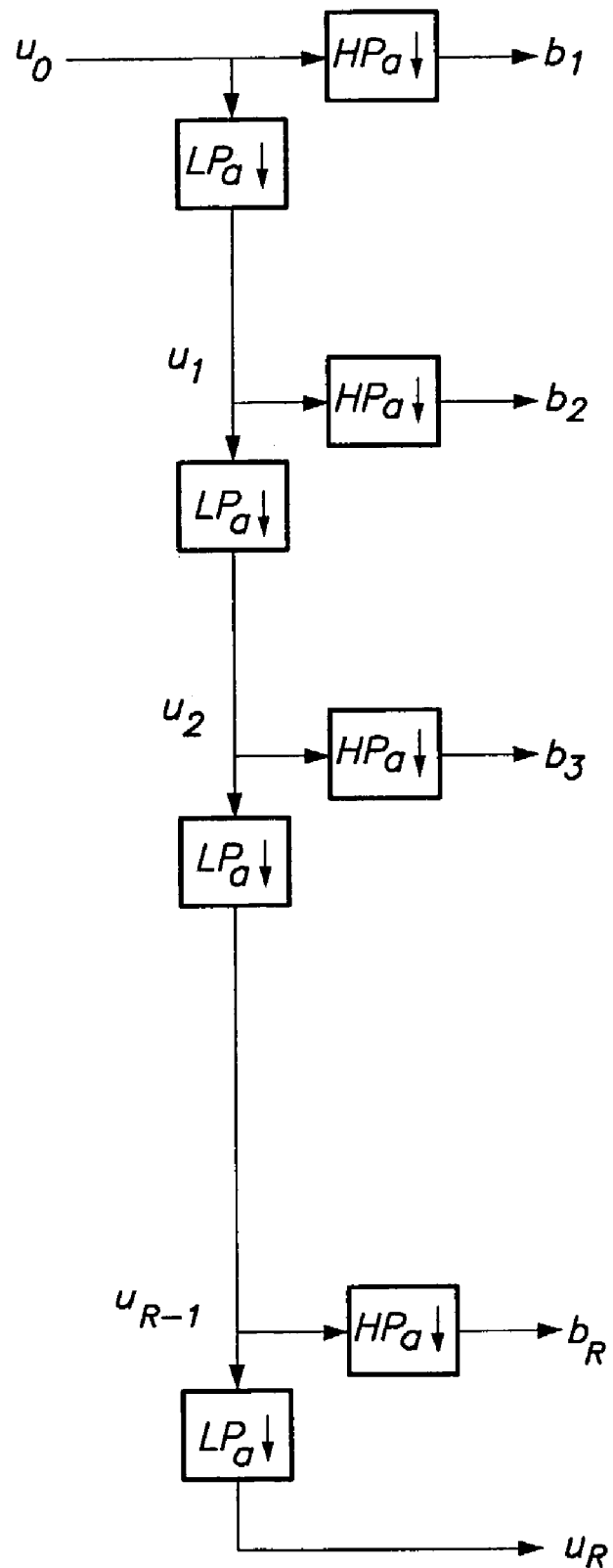
FIG. 6 illustrates a second embodiment of performing the multiscale decomposition step, according to a dyadic wavelet transform.
Figure 7:
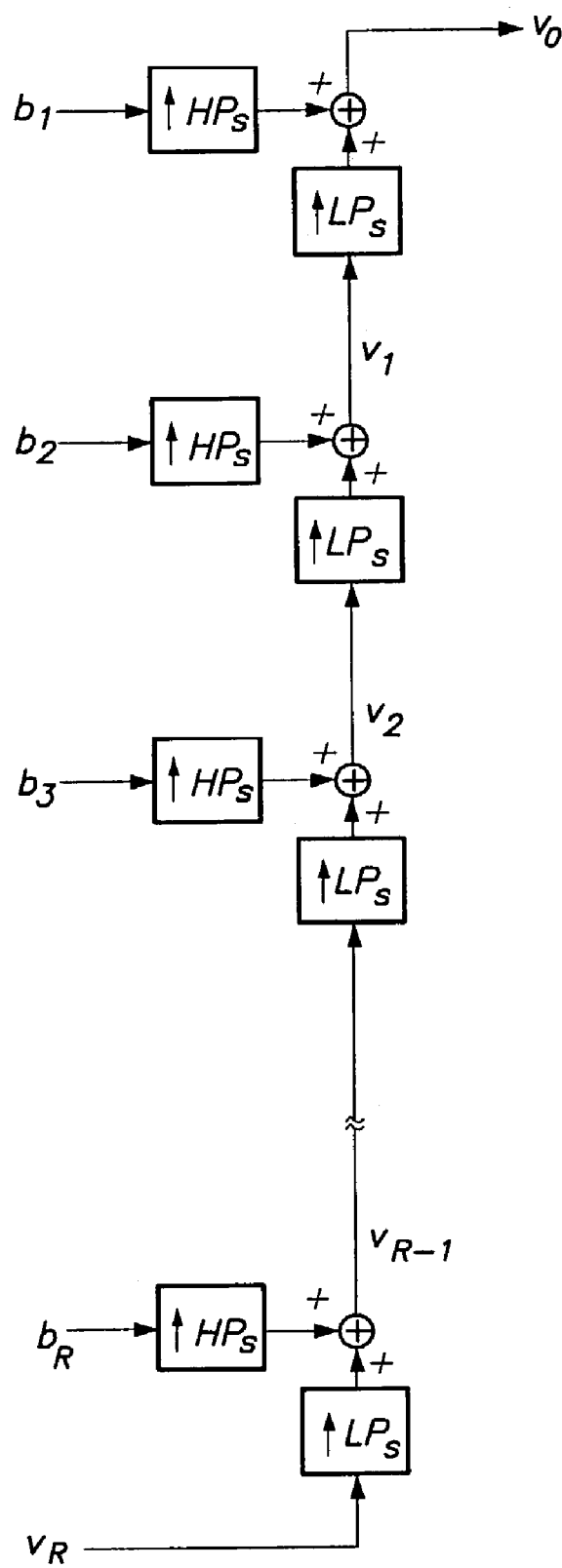
FIG. 7 illustrates the corresponding reconstruction step.

An example of the alternative embodiment is depicted in FIGS. 6 and 7, where FIG. 6 shows a forward dyadic wavelet transform and FIG. 7 the corresponding inverse transform.

In the forward transform, shown in FIG. 6, the original image $u_0$ is split into a larger-scale approximation image $u_1$ and a detail coefficient image $b_1$ by applying a low-pass analysis filter $LP_a$ and high-pass analysis filter $HP_a$, respectively, followed by subsampling of both images. This splitting process is repeated R times based on the current approximation image, each time yielding an additional detail coefficient image and an approximation image at the next larger scale.

The flow chart of the corresponding inverse transform is shown in FIG. 7. Starting from the residual image $v_R = u_R$, which is an approximation image at the largest scale, an approximation image $v_{R-1}$ at the next smaller scale is computed by upsampling and low-pass filtering the current approximation image $v_R$, up-sampling and high-pass filtering the detail coefficient image $b_R$, and pixelwise summing the latter results. Subsequent smaller scale approximation images are obtained by iterating this process R times based on the current approximation image $v_k$ and the corresponding detail coefficient image $b_k$.

In a preferred embodiment the high pass filters are directional, e.g. representing grey value transitions in a specific direction. In that case, the detail coefficients $b_k$ at each scale are partitioned into coefficients $bh_k$, $bv_k$, $bd_k$, representing either horizontal, vertical and diagonal detail at that scale. Each of the blocks $HP_a$ then represents a bank of 3 filters, one for each direction.

2. Estimating the Noise Level.

In one embodiment the noise level in the image is estimated on the basis of a single layer of the multiscale representation of the raw digital image at a predetermined scale. Scale zero is preferred because the relative contribution of the noise in that layer is greater than in the larger scale layers, and hence the estimation of the noise level is less influenced by the presence of image details such as edges, spots and textures.

In a first step of estimating the noise level an image is computed that represents the local standard deviation at the predefined scale, i.e. at the finest scale.

The image of local standard deviation at a predefined scale is derived from the corresponding layer of the multi-scale representation. The pixel values of the specified layer represent the deviation of the local average grey value at that scale relative to its corresponding value at the next larger scale. In each pixel of the specified layer a square window of N pixel values $a_i$, centred around the current pixel is taken, and the local standard deviation sdev at current pixel position is computed by taking the square root of the window average of the squared pixel values:

$$sdev = \sqrt{\frac{\sum_{i=1}^{N}(a_i)^2}{N}}$$

From the resulting local standard deviation image the histogram of local standard deviation is derived.

The histogram of an image is an array consisting of a predefined number of bins. Each bin is associated with a specific pixel value interval or single pixel value, in such a way that the entire pixel value range is covered by all subsequent bins. After computation of the histogram each bin represents the absolute or relative number of pixels in the image that have a pixel value within the interval associated with the bin. The histogram is computed as follows. Initially all bins are set to zero count. Next for each image pixel, it is determined to which predefined interval the pixel value belongs, and the corresponding bin is incremented by one.

The histogram of local standard deviation is restricted to those pixels that have a grey value within a subrange of the actual grey value range. This means that for each pixel of the image of local standard deviation, the corresponding histogram bin is incremented only if the corresponding pixel in the grey value image is within specified subrange. If $r_{min}$ and $r_{max}$ are the minimum and maximum grey values respectively of the digital image, then this subrange is defined as:

$$\left[ r_{min} + \frac{m \arg in}{r_{max} - r_{min}}, r_{max} - \frac{m \arg in}{r_{max} - r_{min}} \right].$$

Typically, m arg in is 3%. By restricting the histogram of local standard deviation to pixels with grey value within the latter subrange, one will avoid cluttering of the histogram by pixels of saturated image regions due to wrong exposure setting or other image artefacts.

The histogram of local standard deviation has a very much pronounced peak approximately centred at the noise level. The noise level is defined as the centre of this peak. Alternatively, it can be defined as the local standard deviation value that corresponds to the point where the histogram is maximum, or the median value restricted to the dominant peak of the histogram.

3. Automatic Calculation of the Amplification Factor and Normalisation of the Signal Level.

The pixel values of the digital raw image are proportional to the square root of the radiation dose recorded on the photostimulable phosphor screen. This relation is expressed by the following formula:

$r = \sqrt{G_a \cdot x}$ wherein r represents a raw pixel value, x represents a radiation dose value absorbed by the photostimulable phosphor screen and $G_a$ is the global amplification factor of the image acquisition system.

The average signal level varies from one image to another mainly due to the following factors: radiation dose variations, change of exposure parameters from one exposure to another, attenuation differences related to patient stature, sensitivity change of the read out system.

With regard to the diagnosis, the original signal level is not that relevant. However, the enumerated fluctuations are disturbing the image processing chain.

To avoid the disturbing effect of radiation dose fluctuations on the operation of the image processing chain the raw digital image has to be normalised in a multiplicative way.

$t = r \cdot G_p$ wherein t is a normalised pixel value and $G_p$ is a normalisation factor.

A multiplicative correction is equivalent with a change of the read out sensitivity. In case of over- or under-exposure, this kind of normalisation provides that the image signal is mapped onto a standard signal range. Nevertheless the end result of this operation is not identical to the result one would get with a correct exposure since by the normalisation operation noise present in the image signal is equally amplified with the signal (whereas increasing the dose would result in an improved signal-to-noise ratio).

The normalisation factor $G_p$ can be deduced from characteristics of the raw digital image. For computational reasons however, it is preferred to derive the normalisation factor not directly from the raw digital image, but from its multiscale representation instead.

Once the normalisation factor is determined, it is preferred to apply it immediately to the pixels of the multiscale representation, since the further processing stages are based on the normalised multiscale representation instead of the normalised raw digital image. For that purpose, all layers of the multiscale representation and the residual image are pixelwise multiplied by the normalisation factor $G_p$. In an alternative embodiment, a first multiscale decomposition is applied to the raw digital image, the result of which is used only for determining the normalisation factor $G_p$, next this normalisation is applied to the raw digital image, and a second multiscale decomposition is applied to the normalised raw digital image. The resulting normalised multiscale representation of the raw digital image is identical in both embodiments, and it is used as a basis for further processing.

In this embodiment the normalisation factor $G_p$ is deduced from the multiscale representation of the raw digital image as will be shown hereafter.

Four criteria have been evaluated and can be applied, each having a number of advantages:
first criterion: constant signal level
second criterion: constant noise level
third criterion: constant contrast
fourth criterion: preferred embodiment a) First Criterion: Constant Signal Level According to this criterion a representative grey value is searched for in the histogram of grey values of pixels of the raw digital image.

This representative grey value is mapped onto a constant reference level $T_r$.

The normalisation factor $G_1$ is then equal to $T_r/r_l$ wherein $r_l$ is the representative grey value in the histogram.

This representative grey value is determined as follows:

First a grey value histogram of the raw digital image is calculated restricted to those pixels that have a local contrast-to-noise ratio (CNR) between fixed margins, typically between 2 and 10. The local CNR is represented by a local CNR image that has the same dimensions as the grey value image from which the histogram is to be computed. The representative grey value is determined as the median of that histogram.

By excluding from this calculation the pixel values that have low contrast-to-noise ratio, pixels in a very homogeneous image area which commonly do not represent relevant information are excluded from having too large an influence on the calculation of the median. Such pixels cover a large area in the image and either have a rather small pixel value (e.g. pixels of collimation borders) or a large pixel value (e.g. pixels in background area).

On the other hand, pixels with a very large contrast-to-noise ratio are likewise excluded because they correspond with very strong edges that are commonly found in image regions having a more extreme density.

This criterion is preferably defined in a way so that the representative grey value looked for roughly corresponds with the density of bone material.

In a preferred embodiment, the CNR image is determined at a predefined scale. It is computed by pixelwise dividing the image of local standard deviation at the predefined scale by the estimated noise level. Preferred embodiments of estimating the noise level and computing the image of local standard deviation are described above.

Preferably the CNR image is determined at a predefined scale that contains a major part of the relevant image information without being cluttered by noise.

Preferably this scale is the fourth scale when scales are counted from fine to coarse.

In the smaller scales the relative contribution of noise is larger whereas in the larger scales fine image details tend to disappear.

In the computation of CNR pixels the nominator is based on the local standard deviation at a predefined scale, typically the fourth scale. However, the denominator representing the noise is estimated at smallest scale for reason of robustness. The noise at larger scales will be smaller due to the repeated averaging processes in the multiscale decomposition. The noise at the scale of the nominator can be computed by multiplying the estimated noise at smallest scale by a certain conversion factor, which depends on the weighting factors in the multiscale decomposition scheme. The factor can be determined experimentally by estimating the noise according to the above method both at the smallest scale and at the requested scale, based on an image obtained from a uniform exposure, in which all contributions to local standard deviation can be assumed to be due only to noise. The conversion factor is the ratio of the estimated noise at requested scale to the estimated noise at the smallest scale.

This first criterion provides that the grey value histogram is placed on a fixed position in the grey value range.

This approach provides good results. In case of underexposure however the applied amplification is rather large so that noise is emphasised too extensively.

b) Second Criterion: Constant Noise Level

In a second embodiment another criterion is applied. According to this second criterion the aim is to bring the noise level to a constant target value in accordance with the formula $G_n = T_n/\sigma_{0n}$ wherein $G_n$ is a normalisation factor, $T_n$ represents the target noise level and $\sigma_{0n}$ is the estimated noise level.

The resulting normalisation factor is applied to all pixel values.

The noise level is preferably estimated on the basis of the finest scale of the multiscale representation of the image, as described above.

This second criterion results in a uniform impression of noise in all images.

However, if a different read out sensitivity is chosen, this has an influence on the contrast. Setting the read out sensitivity low (e.g. sensitivity class 100) may result in a contrast which is too explicit, while setting the sensitivity class high (e.g. sensitivity class 400) may result in a contrast which is too weak.

c) Third Criterion: Constant Contrast

In a third embodiment a still different criterion is applied. According to this criterion the aim is to bring the contrast of the most relevant area in the image to a constant level in accordance with the formula $G_c = T_c/\sigma_c$ wherein $G_c$ is a normalisation factor, $T_c$ is the envisaged contrast level and $\sigma_c$ is the original contrast.

This intrinsic image parameter is somewhat arbitrary because average contrast highly varies in the image. The average contrast is not representative because the influence of homogeneous regions (having very low contrast) and of strong border pixels (having large contrast) would be dominating.

The original contrast is determined by computing the histogram of local standard deviation at a predefined scale that is sufficiently large to avoid predominance of noise, preferably at the fourth scale when scales are counted from fine to coarse. The original contrast $\sigma_c$ is defined as the median value of the local standard deviations in the histogram. The histogram of local standard deviation is computed as described above.

The influence of large homogeneous areas like collimation borders on the original contrast measure is substantially reduced, by excluding from the histogram all those pixels of which the local standard deviation is inferior to a certain threshold. The threshold is specified proportional to the noise level. Preferably, the threshold is twice the noise level.

The noise itself is estimated at the smallest multiscale scale, as described above.

The noise at larger scales will be smaller due to the repeated averaging processes in the multiscale decomposition. The noise at the predefined scale at which the original contrast is computed by multiplying the estimated noise at smallest scale by a certain conversion factor, which depends on the weighting factors in the multiscale decomposition scheme. The factor can be determined experimentally by estimating the noise according to the above method both at the smallest scale and at the requested scale, based on an image obtained from a uniform exposure, in which all contributions to local standard deviation can be assumed to be due only to noise. The conversion factor is the ratio of the estimated noise at requested scale to the estimated noise at the smallest scale.

In this embodiment the aim is to have the same amount of contrast in all images. This results in a smoothed reproduction in case of images initially having high contrast, such as thorax images. This effect is only desirable to a limited extent since a complete compensation is experienced as being not natural.

d) Fourth Criterion

The inventors have found that the inconveniences that are enumerated at the end of the description of each of the first to the third embodiment are solved to a large extend if the normalisation factor $G_p$ is determined by combining the three criteria:

$$G_p = G_l^{p_l} \cdot G_n^{p_n} \cdot G_c^{p_c},$$

in which the exponents $p_l$, $p_n$, $p_c$, each having a value in the range [0, 1] specify the relative contribution of each normalisation factor. This criterion is equivalent to one of the three mentioned above if one of the exponents is one, and the others are zero.

In our preferred embodiment $p_l$ is 0.5, $p_n$ is 0.25 and $p_c$ is 0.25.

4. Reconstruction and Multiscale Gradation

When the (optional) procedures for contrast enhancement shown in FIG. 2 have been performed, the image is reconstructed by applying to the modified detail images the image transform that is the inverse of the multiscale decomposition.

Details on the ordinary reconstruction procedure are described higher in the paragraph relating to image decomposition.

In accordance with this invention, multiscale gradation is implemented by inserting a series of scale-specific conversion functions in the reconstruction process. At each stage in the reconstruction process where a conversion function is inserted, the latter is applied to the approximation image at a scale corresponding to the current iteration, and the result of conversion is used as the input image of the next iteration, as described below.

Figure 5:
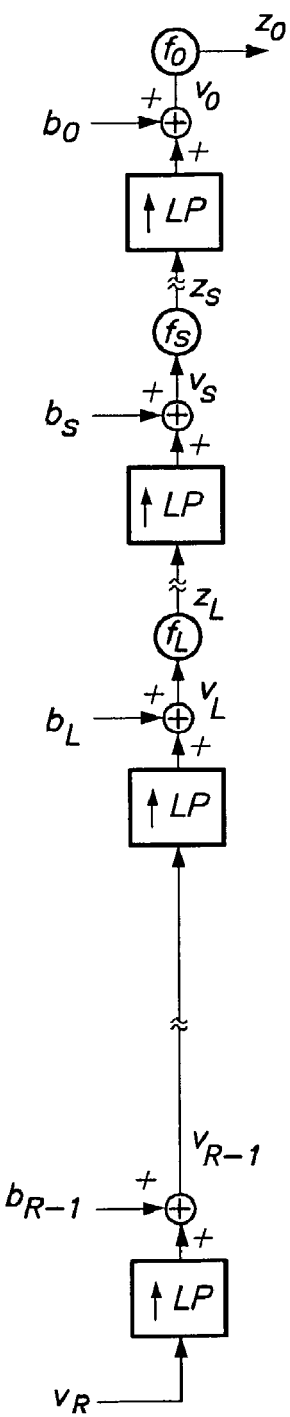
FIG. 5 shows an embodiment of multiscale gradation according to a first multiscale transform embodiment.

Referring to FIG. 5 which shows a multiscale gradation embodiment according to the Burt pyramid transform, the normal inverse transform is modified as follows.

From the iteration that corresponds with the scale k=L until the smallest scale k=0, the computed approximation image $v_k$ is pixelwise converted by a scale-specific conversion function $f_k(\ )$ before it is passed to the next iteration.

Figure 8:
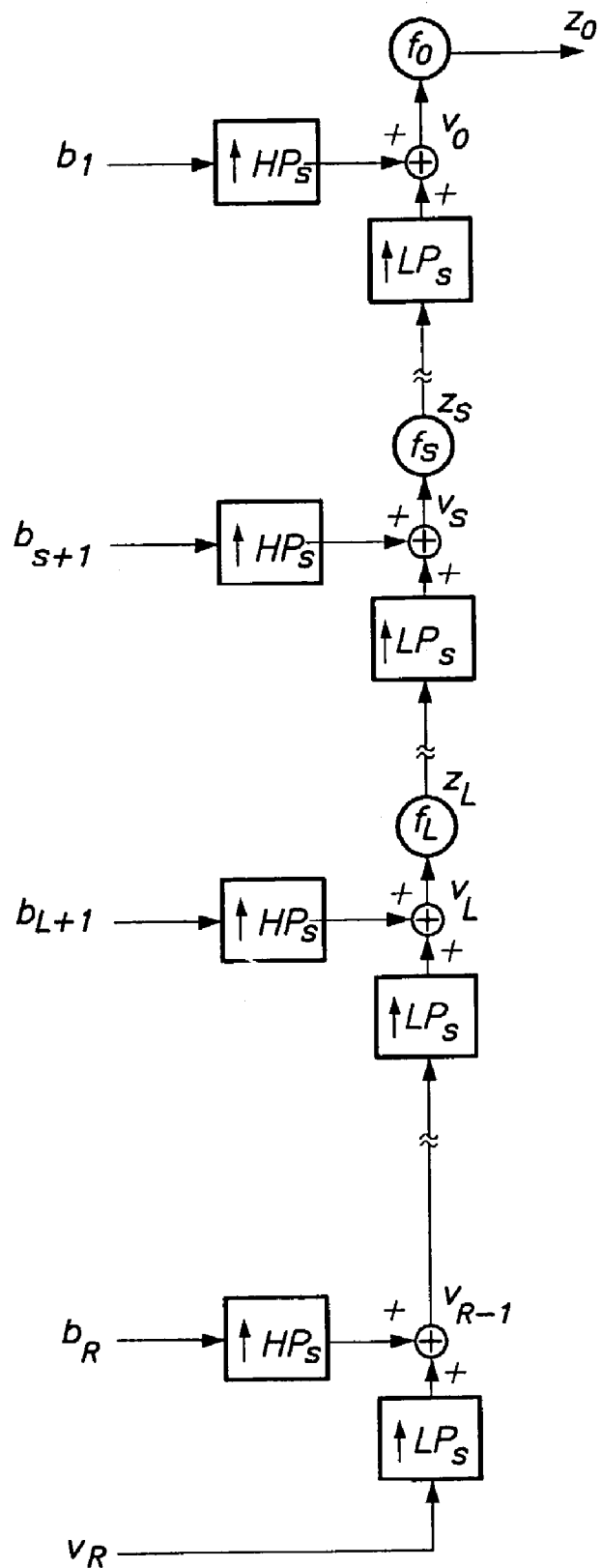
FIG. 8 shows an embodiment of multiscale gradation according to the second multiscale transform embodiment

As to the second multiscale transform embodiment described sub 1, i.e. dyadic wavelet transform, the modification for implementing multiscale gradation is very similar. Referring to FIG. 8, from the iteration that corresponds with the scale k=L until the smallest scale k=0, the computed approximation image $v_k$ is pixelwise converted by a scale-specific conversion function $f_k(\ )$ before it is passed to the next iteration By an appropriate choice of the series of conversion functions $f_k(\ )$ it is possible to specify the contrast amplification as a function of grey value and scale, and to specify grey value-to-density mapping independently from detail contrast amplification.

To this end, the scale-specific conversion functions $f_k(\ )$ are determined as will be described below, starting from a series of functions $gm_k(\ )$, referred to as scale-specific gradient functions. For a specific scale k, the corresponding scale-specific gradient function $gm_k(\ )$ specifies the amount of contrast amplification at that scale. Equivalently, the scale-specific gradient function at scale k specifies how much a small pixel value difference (i.e. detail contrast) at that scale is amplified by the combined effect of all concatenated conversion functions $f_k(\ )$ up to the smallest scale k=0.

Also, the scale-specific gradient function $gm_k(\ )$ specifies to which extent the finally reconstructed image $z_0$ is sensitive to a unit detail arising from a pixel with unit value in the corresponding detail image, i.e. $b_k$ in case of the Burt pyramid transform, or $b_{k+1}$ in case of the dyadic wavelet transform.

The scale-specific gradient functions are equivalent to the partial derivative functions:

$$gm_k(t) = \frac{\partial z_0}{\partial z_{k+1}}, k = 0, 1, \ldots, L$$

in which $z_k$ represents the image that results from pixelwise applying the conversion function $f_k(\ )$ to the approximation image $v_k$, and $t=v_L$, i.e. the pixel value of the partially reconstructed image at scale L, which is the largest scale involved in multiscale gradation. In the present context, the pixel values t are referred to as the large-scale average grey values.

Relying on the concatenation rule for derivation, the scale-specific gradient functions can be written as:

$$gm_k(t) = f_0'(F_1(t)) \cdot f_1'(F_2(t)) \cdot \ldots \cdot f_k'(t),$$

in which $f_k'(t)$ represent the derivative functions of the scale-specific conversion functions.

The cumulative conversion functions at subsequent scales are the concatenation of scale-specific conversion functions $f_k()$ from the largest scale L involved in multiscale gradation, up to the scale considered:

$$F_k(t) = f_k \circ f_{k+1} \circ \ldots \circ f_L(t),$$

in which the operator ∘ stands for function concatenation.

The derivative of a cumulative conversion function with respect to t is equal to:

$$F_k'(t) = f_k'(F_{k+1}(t)) \cdot f_{k+1}'(F_{k+2}(t)) \cdot \ldots \cdot f_L'(t),$$

or equivalently, the derivatives of cumulative conversion functions can be expressed in terms of scale-specific gradient functions:

$$F_0'(t) = gm_L(t)$$

$$F_k'(t) = \frac{gm_L(t)}{gm_{k-1}(t)} \quad k = 1, 2, \ldots, L$$

The cumulative conversion functions are then obtained by integration:

$$F_0(t) = \int_{t_0}^{t} gm_L(x) \cdot dx$$

$$F_k(t) = \int_{t_0}^{t} \frac{gm_L(x)}{gm_{k-1}(x)} \cdot dx \quad k = 1, 2, \ldots, L,$$

where $t_0$ is the abscissa t at which $F_k(t)=0$. This parameter determines the offset of the cumulative conversion functions. For convenience, it may be set to 0; then all cumulative conversion functions will cross the origin of the coordinate system.

The scale-specific conversion functions $f_k()$ are finally obtained by inversion of the cumulative conversion functions $F_k(t)$:

$$f_k() = F_k \circ F_{k+1}^{-1}(), \quad k=0, 1, \ldots, L-1$$

$$f_L() = F_L()$$

In a preferred embodiment, function inversion is avoided by storing all functions in tabular form (i.e. as lookup tables).

First, the tables of scale-specific gradient functions $gm_k()$ are computed in a way that will be described below.

Next, the cumulative conversion functions $F_k(t)$ are computed by conventional numerical integration techniques such as the trapezoidal rule, and also stored in tabular form as N equidistant points $(t_i, F_k(t_i))$, $i=0,1, \ldots, N-1$.

Finally, from these tables, the scale-specific conversion functions $f_k()$ are easily derived, also in tabular form. The N (abscissa, ordinate) pairs that define the function $f_k()$ are given by $(F_{k+1}(t_i), F_k(t_i))$, for the scales $k=0,1, \ldots, L-1$. At scale L which is the largest scale considered in the multiscale gradation process, the function $f_L()$ is identical to $F_L()$. Hence in tabular form the latter is specified by $(t_i, F_L(t_i))$.

This way, all scale-specific conversion functions are defined by series of points, which in general, are non-equidistant. Therefore, the functions $f_k()$ have to be interpolated in order to be evaluated at arbitrary integer input values.

In accordance with the process described above, the behaviour of multiscale gradation is entirely determined by the shapes of the gradient functions $gm_k()$ at subsequent scales. Small-scale, medium-scale and large-scale contrast are controlled by specifying appropriate scale-specific gradient functions, as described below.

5. Large-Scale Gradient Function

The large-scale gradient function $gm_L(t)$ specifies the contrast amplification at a large scale L, which is the largest scale involved in multiscale gradation. In the absence of smaller scale detail, i.e. if all detail pixels $b_k$ (or $b_{k+1}$ in case of dyadic wavelet transform) are equal to zero at scales $k=0,1, \ldots, L-1$, then it also determines how the grey values of the large scale approximation image $v_L$ are mapped onto the density scale of the visible image. The integral of the large-scale gradient function is then equivalent to an ordinary gradation function to be applied to the image $v_L$. In the normal case, i.e. when detail at smaller scale is actually present, then the integral of the function still determines the large-scale average density distribution of the visible image, which is further modulated by smaller-scale details.

In one preferred embodiment, the large-scale gradient function $gm_L()$ is obtained as the derivative of what will be referred to as large-scale gradation function $y_L(t)$, where the latter function is determined by three points of the image histogram, as disclosed in copending European patent application EP 02100181.3.

$$gm_L(t) = \frac{d}{dt} y_L(t)$$

To this end, a large-scale gradation function is generated which yields a fixed contrast and a fixed density in one specific point, referred to as anchor point.

Figure 9:
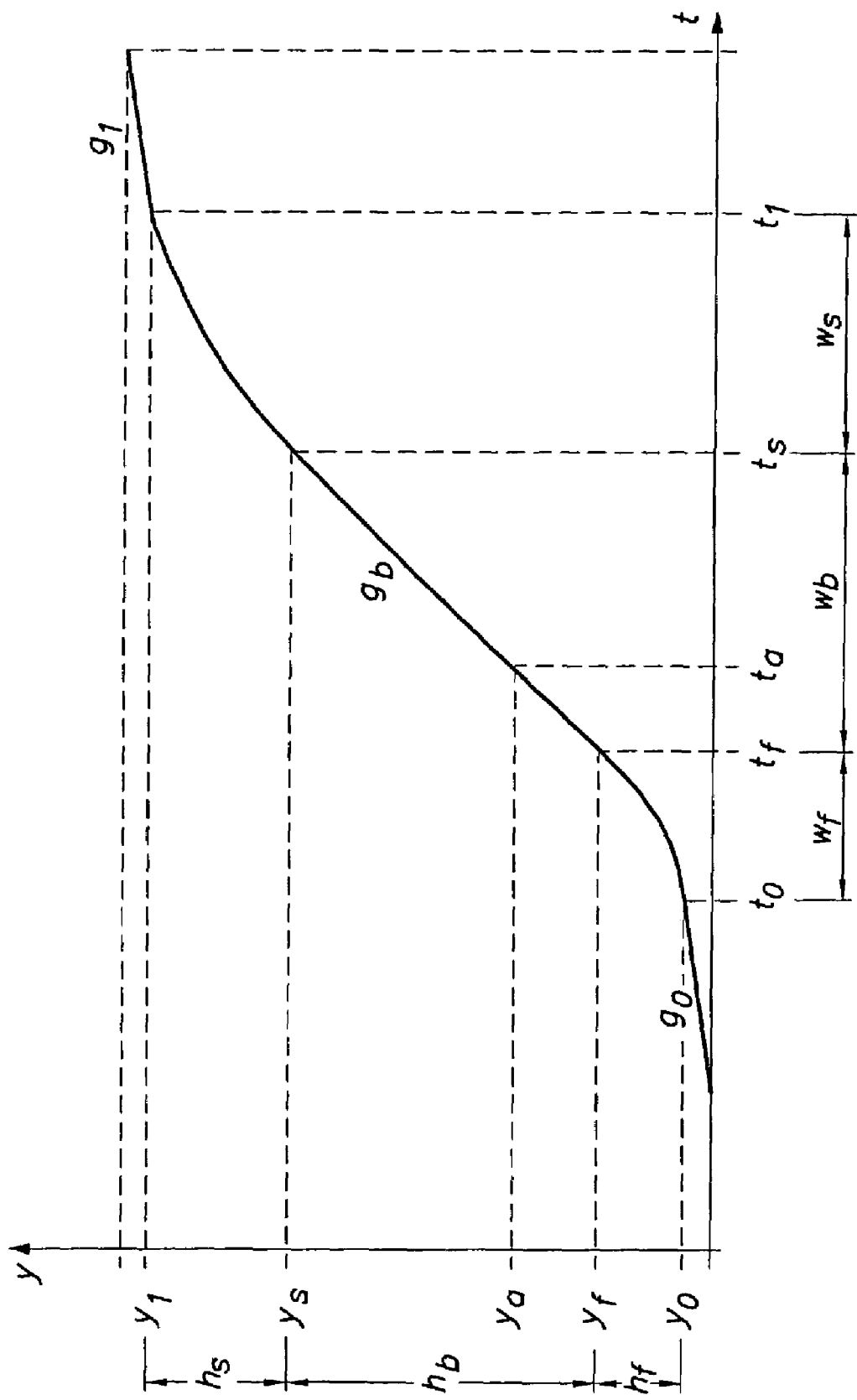
FIG. 9 shows an embodiment of a large-scale gradation curve composed of three contiguous segments with linear extensions

Preferably the large-scale gradation function is composed of three contiguous segments, as depicted in FIG. 9, termed foot, body and shoulder segments, respectively. The segments are defined in such a way, that the composite gradation function is continuous along its entire domain, and also its derivative is continuous.

The body segment is linear, and it ensures fixed predefined gradient $g_b$ across the body subrange $w_b$, which is intended to coincide with the most relevant subrange of pixel values. The foot segment spanning the foot subrange $w_f$ provides a gradual increase of gradient from a predefined initial gradient $g_0$ up to the body gradient $g_b$. The corresponding subrange is considered a transition zone from the lowest pixel values that carry no diagnostically relevant information, up to the most relevant body subrange. The foot segment is characterised by its subrange width $w_f$ and height $h_f$ on the ordinate axis. Its average gradient $g_f$ is defined by the ratio $h_f/w_f$. The initial ordinate value of the foot segment corresponds with the smallest value of the ordinate range $y_0$, i.e. the smallest possible value of the output image. The transition point from foot to body is specified by the abscissa $t_f$. The shoulder segment spanning the subrange $w_s$ provides a gradual decrease from the body gradient $g_b$ down to a predefined final gradient $g_1$. This segment is characterised by its width $w_s$ and a predefined average gradient $g_s$, which defines the ratio $h_s/w_s$, in which $h_s$ is the shoulder segment height on the ordinate axis. The final ordinate value of the shoulder is made to coincide with the greatest value of the ordinate range $y_1$.

The body segment has a predefined gradient $g_b$ and a predefined anchor point $t_a$. The anchor point has a predefined output pixel value $y_a$. This condition ensures that contrast and density remain fixed in the anchor point. The width of the foot, body and shoulder segments is not specified explicitly. Instead, for each individual image three characteristic pixel values are determined, which specify the lower foot bound $t_0$, the anchor point $t_a$ and the upper shoulder bound $t_1$. The other parameters that determine the shape of the composite gradation function are predefined, i.e. they do not depend on any characteristic of the individual images. Given the predefined parameters and the parameters $t_0$, $t_a$ and $t_1$ which are determined specifically for each image, a composite gradation function is determined that spans the cumulative abscissa subrange $w_f + w_b + w_s$ and the corresponding ordinate range $[y_0, y_1]$, in compliance with the above requirements of continuity.

One embodiment of the composite gradation function is defined by:

$$y_L(t) = y_0 + h_f \cdot ft\left(\frac{t - t_0}{w_f}\right)$$

if t is in the foot subrange $[t_0, t_f]$ $[y_L(t)=y_0+h_f+g_b\cdot(t-t_f)]$ if t is in the body subrange $[t_f, t_s]$ $$y_L(t) = y_1 - h_s \cdot sh\left(\frac{t_1 - t}{w_s}\right)$$

if t is in the shoulder subrange $]t_s, t_1]$

In this embodiment the function that corresponds with the foot segment is defined by:

$$ft(x) = x \cdot g_{0f}^{1-x^{p_f}}$$

in which:

$$g_{0f} = g_0 \cdot \frac{w_f}{h_f}$$

is the relative initial foot gradient $$p_f = \frac{1 - g_b \cdot \frac{w_f}{h_f}}{\ln(g_{0f})}$$

In this embodiment the function that corresponds with the shoulder segment is defined by:

$$sh(x) = x \cdot g_{1s}^{1-x^{p_s}}$$

in which:

$$g_{1s} = g_1 \cdot \frac{w_s}{h_s}$$

is the relative final shoulder gradient $$p_s = \frac{1 - g_b \cdot \frac{w_s}{h_s}}{\ln(g_{1s})}$$

The above formulation of the foot and shoulder segments based on concatenated exponentials ensures that:
$y_L(t_0) = y_0$, and $y_L(t_1) = y_1$
continuity is guaranteed in the transition points $y_L(t_f)$ and $y_L(t_s)$
$y_L'(t_0) = g_0$ and $y_L'(t_1) = g_1$
the gradient is continuous in the transition points $y_L'(t_f)$ and $y_L'(t_s)$, and it has a constant value $g_b$ in between
the output has a predefined value $y_a$ in the anchor point $t_a$.
The latter two features ensure that the most relevant subrange of pixel values associated with the body segment has a specified density and contrast.

The position of the anchor point $t_a$, the lower foot segment bound t0 and the upper shoulder segment bound t1 are made dependent on the image subrange characteristics, as will be described further on.

The following parameters are predefined:

$y_0$, $y_a$, $y_1$, $g_0$, $g_f$, $g_b$, $g_s$, $g_1$.

The other parameters which are needed to generate the above composite gradation function, i.e. $w_f$, $h_f$, $w_s$, $h_s$, are derived as follows.

The width $w_f$ and height $h_f$ of the foot segment are found by solving the set of equations, which specify the heights of the left body part and foot segment, respectively:

$y_a - y_0 - h_f = (t_a - t_0 - w_f) \cdot g_b$ $h_f = w_f \cdot g_f$ yielding:

$$w_f = \frac{(t_a - t_0) \cdot g_b - y_a + y_0}{g_b - g_f}$$

$h_f = w_f \cdot g_f$

Similarly, the width $w_s$ and height $h_s$ of the shoulder segment are found by solving the set of equations, which specify the heights of the right body part and shoulder segment, respectively:

$y_1 - y_a - h_s = (t_1 - t_a - w_s) \cdot g_b$ $h_s = w_s \cdot g_s$ yielding:

$$w_s = \frac{(t_1 - t_a) \cdot g_b - y_1 + y_a}{g_b - g_s}$$

$h_s = w_s \cdot g_s$

The predefined values preferably lie in the following ranges:
$y_a$: [10, 40], default 20% of output range $[y0, y1]$
$g_b$: depends on internal scaling factors throughout the imaging system, and on the available output range
$g_0$: [10, 30], default 20% of body gradient gb
$g_f$: [25, 50], default 40% of body gradient gb $g_s$: [25, 50], default 40% of body gradient gb
$g_1$: [5, 20], default 10% of body gradient gb In any case the gradients must respect the following inequalities:

$$g_0 < g_f < g_b$$

$$g_1 < g_s < g_b$$

The foot and lower body segments evolve as follows with varying lower subrange. If $t_0$ exceeds a maximum bound $t_{0ub}$, then it is set to this value $$t_0 \leq t_{0ub} = t_a - \frac{y_a - y_0}{g_b}$$

In this case, the foot segment is collinear with the body segment. If the width of $[t_0, t_a]$ increases, then a foot segment is emerging in the lower subrange. The foot segment becomes more significant at the expense of the linear part as the lower subrange width further increases.

Ultimately, a lower limit for to is reached, $t_{0lb}$, defined by:

$$t_0 \geq t_{0lb} = t_a - \frac{y_a - y_0}{g_f}$$

The upper body segment and shoulder evolve in a similar manner. The bounds for $t_1$ are defined by:

$$t_1 \geq t_{1lb} = t_a + \frac{y_1 - y_a}{g_b}$$

$$t_1 \leq t_{1ub} = t_a + \frac{y_1 - y_a}{g_s}$$

The bounds of $t_0$ and $t_1$ may be further constrained in order to ensure that foot or shoulder cannot entirely vanish, i.e. a minimum foot and shoulder width are specified. Preferably, $h_f$ and $h_s$ should be enforced to be at least 10% of the output range $[y_0, y_1]$. This avoids abrupt changes of contrast in the vicinity of the subrange bounds $t_0$ and $t_1$, respectively.

Further constraints may be imposed to the bounds of $t_0$ and $t_1$ in order to enforce a minimum or maximum portion of body segment left or right of the anchor point $t_a$. With this measure one can ensure that there is at least a central portion of the gradation function that is entirely linear.

The large-scale gradation function is extended by linear segments left from $t_0$ and right from $t_1$, as depicted in FIG. 9. These marginal segments having gradients $g_0$ and $g_1$ respectively, provide that any valuable grey values that might fall outside the subrange $[t_0, t_1]$ due to inaccurate determination of the subrange bounds, are still converted into output pixel values with non-zero large-scale contrast. The gradients $g_0$ and $g_1$ are equal to the initial foot gradient and final shoulder gradient, respectively.

The predefined position of the default output subrange $[y_0, y_1]$ that corresponds to the selected input range $[t_0, t_1]$ is preferably such that it provides some margin for both gradation function extensions. For example, in case of a 15 bit pixel range, the default output range is preferably defined as the range $[y_0=8192, y_1=24575]$. The corresponding window width is 50%, and the window centre is 50%.

The composite gradation function is generated as described above based on predefined parameters, and on three parameters $t_0$, $t_1$, and $t_a$, which depend on intrinsic image characteristics. The position of the anchor point $t_a$ and the subrange bounds $t_0$ and $t_1$ are determined based on a figure of merit. The latter is derived from the enhanced image, i.e. the image that results from partial reconstruction up to the large scale L.

To this end, a first grey value histogram is computed of the enhanced image, and a second histogram of the same image, the second histogram being restricted to those pixels that are flagged as relevant in a binary mask image, that has the same dimensions as the enhanced image. The second histogram represents the relative frequency of grey values in the enhanced image, restricted to the relevant pixel regions.

The figure of merit $fom_j$ is determined for each grey value j within the range of the enhanced image, as follows:

$$fom_j = \frac{hr_j \cdot hu_j - q_m}{\max_j (hr_j \cdot hu_j - q_m)}$$

in which $hu_j$ and $hr_j$ represent the bin value counts of the unrestricted and restricted histograms, respectively, and in which the maximum is taken across the whole range of grey values.

Each restricted histogram count is balanced by the corresponding count in the unrestricted histogram, raised to a predefined exponent $q_m$. This exponent is set to a value smaller than one, in order to limit the correction. The rationale behind this correction is the consideration that the relevance of a grey value does not only depend on how many times this value is found in the image, but at the same time, on the rate at which pixels having this value also belong to an image region that is considered relevant, as specified by the binary mask. The greater the ratio of relevant versus irrelevant pixels that have a specific grey value, the greater the figure of merit for that grey value will be.

The exponent $q_m$ is preferably set to a value in the range [0, 1], most preferably 0.25. In the extreme case where $q_m$ is set to zero, there is no correction. In the other extreme case where $q_m$ equals one, the ratio of relevant to irrelevant pixels entirely determines the figure of merit. The figure of merit is in the range [0, 1], 1 indicating highest relevance.

In this embodiment the lower subrange bound $t_0$ is determined as the pixel value j for which the figure of merit $fom_j$ exceeds a predefined threshold $Tf_0$, starting from the lowest grey value. Similarly, the upper subrange bound $t_1$ is determined as the pixel value j for which $fom_j$ exceeds a predefined threshold $Tf_1$, starting from the maximum grey value, and proceeding downwards.

The anchor point $t_a$ is determined as follows. Starting from the figure of merit maximum, i.e. the grey value $j_m$ for which $fom_j=1$ the grey value index j is decremented until $fom_j < Tf_a$, the latter representing a predefined threshold. The index at threshold crossing specifies the anchor point.

The thresholds for the subrange bounds are preferably very small, in order to minimise the risk of excluding relevant grey data from the selected subrange, e.g. $Tf_0=0.01$ and $Tf_1=0.01$. The threshold for the anchor point is preferably in the range [0.1,0.5], most preferably 0.35.

The binary mask image that flags the relevant image pixels is needed is for determining the restricted grey value histogram. In a preferred embodiment, the binary mask image is derived from a local CNR image.

The dimensions of the mask image has to be adjusted to the dimensions of the local CNR image, which preferably has dimensions that corresponds with the fourth scale of the multiscale representation, as described above. The mask pixels are set to binary TRUE if the corresponding CNR pixel has a local CNR value in the range [$Tc_0$, $Tc_1$]. Hence the pixel values that have low contrast-to-noise ratio, e.g. pixels in a very homogeneous image area which commonly do not represent relevant information are excluded from the binary mask.

On the other hand, pixels with a very large contrast-to-noise ratio are likewise excluded because they correspond with very strong edges that are commonly found in image regions having a more extreme density. The preferred threshold values are $Tc_0=2$, $Tc_1=10$.

In a next step, the mask image is enhanced by applying a cascade of morphological filters to it, corresponding to an opening filter, followed by a closing. The opening filter first eliminates small isolated patches of TRUE pixels in the mask image, and the subsequent closing filter eliminates the holes in the mask.

The disk radius of the structuring elements of the morphological filters is preferably between one and three.

In a second embodiment the large-scale gradient function $gm_L(\ )$ is computed immediately from the pixel value histogram. To this end, a first grey value histogram is computed of the enhanced image, and a second histogram of the same image, the second histogram being restricted to those pixels that are flagged as relevant in a binary mask image, that has the same dimensions as the enhanced image. The second histogram represents the relative frequency of pixel values in the enhanced image, restricted to the relevant pixel regions. The second histogram is referred to as the restricted histogram. The binary mask image that flags the relevant image pixels is computed as described above.

The large-scale gradient function is defined by:

$$gm_L(t) = g_0 \quad\quad t < t_0$$
$$gm_L(t) = (y_1 - y_0) \cdot \frac{his(t)^{A_s}}{\int_{t_0}^{t_1} his(x)^{A_s} dx}, \quad t_0 \leq t \leq t_1$$
$$gm_L(t) = g_1 \quad\quad t > t_1$$

wherein his(t) is the restricted histogram, $A_s$ is a parameter that determines the shape of the large-scale gradient function, [$t_0$, $t_1$] specifies the relevant grey value subrange and [$y_0$,$y_1$] is the corresponding density range, $g_0$ and $g_1$ are the fixed large-scale gradient values outside the relevant subrange. Preferably, $g_0$ and $g_1$ must be in the range [1%,50%] of the maximum large-scale gradient value, most preferably 15%. The numerator is a normalisation factor that ensures that the integral of the large-scale gradient function is equal to the corresponding density range spanned:

$$\int_{t_0}^{t_1} gm_L(x) dx = y_1 - y_0$$

In a preferred embodiment, the histogram is discrete, and the integral reduces to a sum. The relevant subrange [$t_0$, $t_1$] is derived from the restricted histogram by thresholding in a similar way as described in the first embodiment.

The parameter $A_s$ determines the shape of the histogram. In the one extreme case, $A_s$ is zero, the large-scale gradient function is constant, which is equivalent to a linear large-scale gradation. In this case, the large-scale contrast is rather poor, and the visible image will look greyish. In the other extreme case, $A_s$ is one, the large-scale gradient is identical to the restricted histogram. In that case, the corresponding large-scale gradation is identical to the curve one would obtain from histogram equalisation. In certain sense this shape yields best results, because a wider density range is reserved for highly populated grey values (i.e. peaks in the histogram), and only a narrow density range is assigned to sparsely populated grey value subranges. This paradigm provides optimal large-scale contrast. However, it may cause excessive large-scale contrast amplification in those density regions having a very high histogram count. Moreover, the resulting large-scale gradient and corresponding gradation function depend strongly on the individual image histograms. If the histogram has a peculiar shape with very pronounced peaks and dips, this may cause a strange-looking image. Therefore, a compromise is preferred, e.g. by setting $A_s=0.5$.

It must be noted that the large-scale contrast fluctuations caused by peaks and dips in the histogram, in the present context is less critical than in the conventional application of histogram equalisation where the visible image is an immediate result of the latter processing. The reason is, that in the present case, histogram equalisation is applied only to the large-scale image data, which is more tolerant to inappropriate amplification, than when histogram equalisation would be applied to the full-scale grey value image, in which case also the small-scale contrast is affected.

In a third embodiment, the large-scale gradient function is obtained in a way similar to the second embodiment, but in which the corresponding large-scale gradation function $y_L(t)$ is adjusted in such a way that it has a predetermined value in a few characteristic points.

Such characteristic points $t_0$, $t_a$, $t_1$ are determined from the original and the restricted histogram in the way described in the first embodiment. $t_0$ and $t_1$ determine the bounds of the relevant grey value subrange, and $t_a$ is referred to as the anchor point. Alternatively, $t_0$, $t_a$ and $t_1$ are each specified by a predetermined percentile position on the restricted histogram.

The large-scale gradient function is adjusted so that:

$$\int_{t_0}^{t_a} gma_L(x) dx = y_a - y_0$$
$$\int_{t_a}^{t_1} gma_L(x) dx = y_1 - y_a$$

The latter ensures that the large-scale gradation function maps the characteristic points $t_0$, $t_a$, $t_1$ to the values $y_0$,$y_a$,$y_1$ respectively. By associating the anchor point with a particular tissue type (characterized by its relative position on the restricted histogram), it is possible this way to enforce a predetermined density $y_a$ to the regions with grey value $t_a$. This adjustment diminishes the density fluctuation caused by varying histogram shape.

If no adjustment is done, and if $A_s$ is one, then the density values $y_0$, $y_a$, $y_1$ expressed as a percentage of the output range are equal to the percentiles that specify $t_0$, $t_a$, $t_1$, because the t-value percentiles and y-values evolve both as the integral of the histogram along the pixel value axis. Effective density adjustment will be achieved if $y_a$ is set to a value different from the $t_a$-value percentile. E.g. if percentile($t_a$)=75% and $y_a$=65%, then the anchor point density will be lower than the default value resulting from histogram equalisation (the latter being 75%). Preferred settings for general radiography are: $A_s$=0.5;$t_0$, $t_a$, $t_1$=20%, 75%, 99%; $y_0$, $y_a$, $y_1$=20%, 65%, 100%. However, it is clear that many other combinations may provide appropriate quality, depending on the study type and the personal preference of the radiologist.

The adjustment of the large-scale gradient function is accomplished as follows. If the anchor point density is specified to be $y_{at}$ instead of $y_a$, $y_{at}>y_a$, then the large-scale gradient function is raised in the subdomain [$t_0$, $t_a$], and lowered in the subdomain [$t_a$, $t_1$] to such an amount that the new integral values across the respective subdomains become ($y_a-y_0$) and ($y_1-y_a$). This can be done in different ways. In a preferred embodiment, the adjusted large-scale gradient function $gma_L(t)$ is restricted to be within predetermined lower and upper large-scale gradient limits $g_{lb}$ and $g_{ub}$, respectively. In the lower domain portion, $t<t_a$, the function is pointwise incremented by a fixed fraction $dg_p$ of the available margin $g_{ub}$–his(t). In the upper domain portion, $t>t_a$, the function is pointwise decremented by a fixed fraction $dg_m$ of the available margin his(t)–$g_{lb}$. Both fractions are chosen SO that the new integral values match the specified density spans ($y_a-y_0$) and ($y_1-y_a$) as set out above. Hence, $$dg_p = \frac{y_{at} - y_a}{g_{ub} \cdot (t_a - t_0) - (y_a - y_0)}$$

$$gma_L(t)=gm_L(t)+dg_p\cdot(g_{ub}-gm_L(t)) \quad t_0 \leq t < t_a$$

$$dg_m = \frac{y_{at} - y_a}{g_{lb} \cdot (t_1 - t_a) - (y_1 - y_a)}$$

$$gma_L(t)=gm_L(t)+dg_m\cdot(gm_L(t)-g_{lb}) \quad t_a < t \leq t_1$$

$$gma_L(t)=gm_L(t) \quad t=t_a$$

If $y_{at}<y_a$, then the large-scale gradient function is lowered in the subdomain [$t_0$, $t_a$], and raised in the subdomain [$t_a$, $t_1$] in a similar way, to such an amount that the new integral value constraints are again met.

$$dg_m = -\frac{y_{at} - y_a}{g_{lb} \cdot (t_a - t_0) - (y_a - y_0)}$$

$$gma_L(t)=gm_L(t)+dg_m\cdot(gm_L(t)-g_{lb}) \quad t_0 \leq t < t_a$$

$$dg_p = -\frac{y_{at} - y_a}{g_{ub} \cdot (t_1 - t_a) - (y_1 - y_a)}$$

$$gma_L(t)=gm_L(t)+dg_p\cdot(g_{ub}-gm_L(t)) \quad t_a < t \leq t_1$$

$$gma_L(t)=gm_L(t) \quad t=t_a$$

Figure 10:
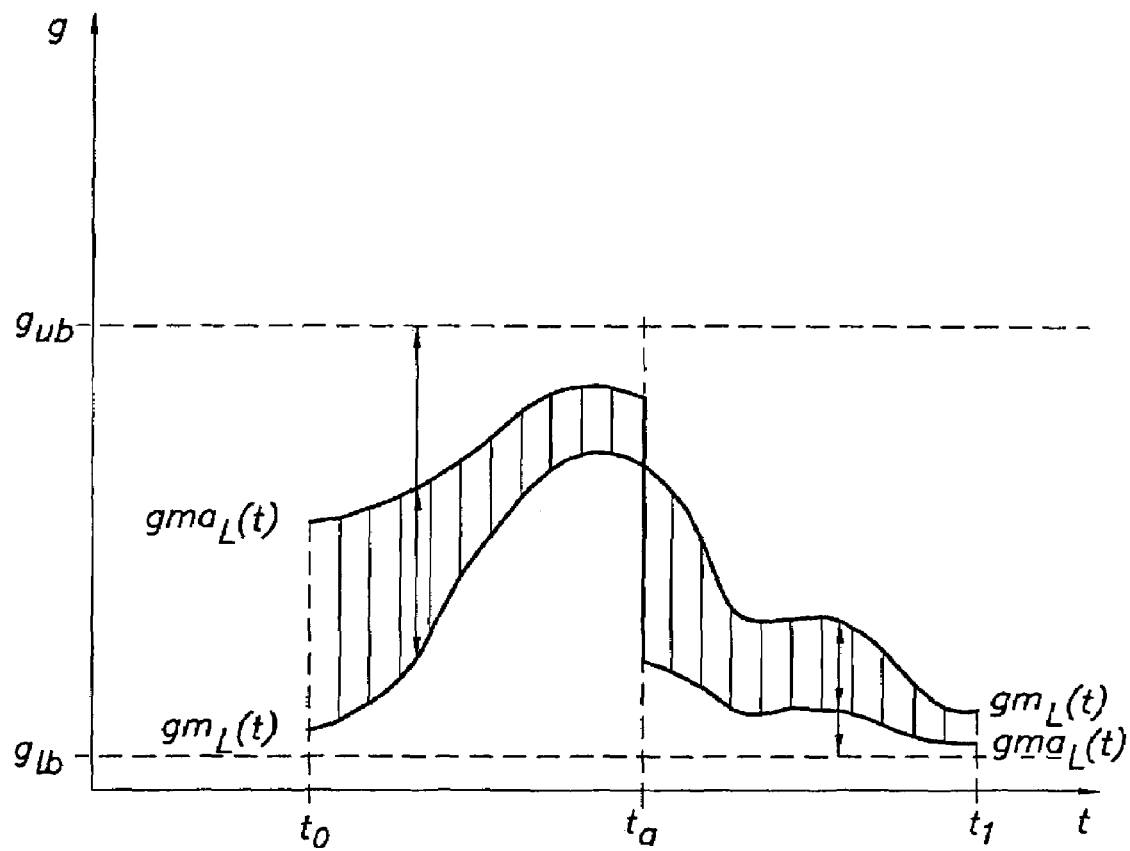
FIG. 10 illustrates the procedure for adjusting the anchor point density.

The adjustment procedure is illustrated in FIG. 10. The hatched areas left and right of $t_a$ correspond with the density shift $y_{at}-y_a$.

The arrows indicate the proportional increment $dg_p$ at an arbitrary position left of $t_a$, and the proportional decrement $dg_m$ at an arbitrary position right of $t_a$, respectively.

The above adjustment procedure introduces a discontinuity in the large-scale gradient function at $t=t_a$. In order to remove the discontinuity, a low-pass filter is applied to the adjusted function $gma_L(t)$. As a consequence, the integral balance between both subdomains is distorted somewhat, causing the anchor point density $y_a$ to shift a bit from its intended position. Therefore, the adjustment procedure and low-pass filtering steps are repeated a few times until the resulting large-scale gradient function $gma_L(t)$ is smooth and simultaneously meets the above integral criterion. This is generally achieved within very few iterations, typically 3 are sufficient.

The above method ensures that the large-scale gradient function is suitably adapted to the actual image histogram, however still providing that the resulting density can be secured at predefined positions.

6. Small-scale Gradient Function

At the smaller scales, the so-called small-scale gradient function $gm_S(t)$ has a predefined shape. The value of this function specifies to which amount the contrast of fine details will be amplified as a function of grey value. Hence, by explicitly defining the shape of this function, it is possible to enforce specific fine detail contrast behaviour across the range of grey values. The small-scale gradient function $gm_k(t)$ is the same for all smaller scales ranging from k=0 through a predefined scale k=S.

As a general rule, the function should have a nominal value in the central part of the relevant grey value subrange following from grey value histogram analysis as described sub 5, and fall off towards the peripheral parts of the subrange. This empirical rule ensures that the contrast is high in the most relevant grey value subrange and gradually vanishes in lowermost and uppermost subranges, in accordance with the 'foot' and 'shoulder' behaviour of common gradation curves in digital systems [such as disclosed in copending European patent application EP 02100181.3], but also in screen-film systems, known as the H&D curves.

In the special case where the small-scale gradient function is chosen identical to the large-scale gradient function, and further identical to the intermediate-scale gradient functions, then the contrast behaviour is the same as if the large-scale gradation function (i.e. the integral function of the function $gm_L(t)$) is applied immediately to the final reconstruction result, i.e. if only a single gradation function is applied in the conventional way.

In accordance with the method of the present invention, it is possible to differentiate the contrast behaviour, which is mostly related to the smaller scales, from the density mapping behaviour which is related to the larger scales, by choosing a small-scale gradient function that differs from the large-scale gradient function. E.g. by specifying the small-scale gradient function basically identical to the large-scale gradient function, except in the lower part of the relevant pixel subrange, where it is made higher, the detail contrast in the lower densities will increase without affecting the detail contrast in the high densities. This setting is favourable for enhancing the contrast of trabecular bone structure. Alternatively, the detail contrast at the skin boundaries can be raised by specifying the small-scale gradient function having high value in the darkmost part of the relevant grey value subrange. Such adjustment is recommended for better visualizing soft tissue lesions near the skin boundary. By specifying a small-scale gradient function that exceeds the large-scale gradient function everywhere, overall contrast is achieved without significantly altering the global distribution of densities (which is determined by the large-scale gradient function).

In a preferred embodiment the small-scale gradient function is specified to have a predefined shape independent from the large-scale gradient function. This way the detail contrast behaviour is not affected by the image histogram. This ensures better consistency of contrast among images, independently from their actual dynamic range.

In a first preferred embodiment, the small-scale gradient function is defined by a sum of displaced gaussians:

$$gm_S(t) = g_{lb} \cdot e^{-\frac{(t-t_{ld})^2}{2\sigma^2}} + g_{md} \cdot e^{-\frac{(t-t_{md})^2}{2\sigma^2}} + g_{hd} \cdot e^{-\frac{(t-t_{hd})^2}{2\sigma^2}},$$

where $t_{ld}$, $t_{md}$, and t specify the centers of each of the low, mid and high grey value bands, respectively; $g_{ld}$, $g_{md}$ and g are predefined parameters that specify the corresponding amount of contrast amplification in these bands, and $\sigma$ is a predefined parameter that specifies the relative band width.

The band centers and the gaussian width $\sigma$ are determined by dividing the relevant grey value subrange $[t_0, t_1]$ into equidistant overlapping bands, preferably $t_{ld}=t_0+0.25 \cdot (t_1-t_0)$; $t_{md}=0.5 \cdot (t_0+t_1)$; $t_{hd}=t_0+0.75 \cdot (t_1-t_0)$; $\sigma=0.125 \cdot (t_1-t_0)$. Preferable settings for the amplification parameters are: $g_{ld}=1.2 \cdot G_d$; $g_{md}=1.0 \cdot G_d$; $g_{hd}=0.85 \cdot G_d$, wherein $G_d$ is a predefined contrast amplification parameter. These settings put more emphasis on contrast in the low-pixel value than in the high-value range. These settings may be altered depending on the viewers preference, or on specific requirements imposed by the study, e.g. to emphasize trabecular bone or to emphasize soft tissue lesions. The actual value of the global parameter $G_d$ depends on the combined gain factors across the entire image processing chain. It should be in the same order of magnitude as the large-scale gradient average.

Optionally, the small-scale gradient function is made dependent on the large-scale gradient function to a certain degree. This is established as follows:

$$gm_S(t) \leftarrow gm_S(t) \cdot \left(\frac{gm_L(t)}{gm_S(t)}\right)^{q_S},$$

where $0 \leq q_S \leq 1$ is a predefined parameter that specifies the amount of dependency. In one extreme case, where $q_S=0$, the small-scale gradient function is independently specified as described above. In the other extreme case, $q_S=1$, the small-scale gradient function is identical to the large-scale gradient function. Preferably, a small amount of dependency is preferred, e.g. $q_S=0.25$, to avoid excessive over- or under-amplification in those cases where the specified small-scale gradient function would significantly deviate from the large-scale gradient function, e.g. due to a peculiar histogram shape.

In a second preferred embodiment, the small-scale gradient function is specified as a function of density, rather than the grey value 't'. This approach has the advantage that the contrast behaviour is immediately related to the output quantity, instead of input quantity. Hence the effect of the function shape is more intuitive to the end user.

The shape of the curve is specified in a similar way as in the first embodiment:

$$gy_S(t) = g_{ld} \cdot e^{-\frac{(y-y_{ld})^2}{2\sigma^2}} + g_{md} \cdot e^{-\frac{(y-y_{md})^2}{2\sigma^2}} + g_{hd} \cdot e^{-\frac{(y-y_{hd})^2}{2\sigma^2}},$$

In this case, y is the average density in the result image, defined by:

$$y=y_L(t)$$

wherein $y_L(t)$ is the large-scale gradation function as defined sub 9a), i.e. the integral function of the large-scale gradient function.

The predefined parameters $y_{ld}$, $y_{md}$ and $y_{hd}$ specify the centers of each of the low, mid and high density bands, respectively; $g_{ld}$, $g_{md}$ and $g_{hd}$ are predefined parameters that specify the corresponding amount of detail contrast amplification in these bands, and $\sigma$ is a predefined parameter that specifies the relative band width.

The band centers and the gaussian width $\sigma$ are determined by dividing the output density range $[y_0, y_1]$ into equidistant overlapping bands, preferably $y_{ld}=y_0+0.25 \cdot (y_1-y_0)$ $y_{md}=0.5 \cdot (y_0+y_1)$; $y_{hd}=y_0+0.75 \cdot (y_1-y_0)$ $\sigma=0.125 \cdot (y_1-y_0)$. Preferable settings for the amplification parameters are: $g_{ld}=1.2 \cdot G_d$; $g_{md}=1.0 \cdot G_d$; $g_{hd}=0.85 \cdot G_d$, wherein $G_d$ is a predefined detail contrast amplification parameter.

In this second embodiment, the small-scale gradient function is defined as a function of density. In order to be usable in the multiscale gradation process described above, it must however be expressed as a function of pixel value, i.e. in the form $gm_S(t)$. Given the function in the form $gy_S(y)$ and the relationship $y=y_L(t)$, it is straightforward to find the small-scale gradient function in the form $gm_S(t)$, because the functions are available in tabular form, and consequently, explicit function inversion is avoided.

In a third embodiment, the small-scale gradient function is specified in the same way as in the second embodiment. However, in this case, the global contrast amplification factor $G_d$ is made dependent on the noise level $\sigma_{0n}$. This makes it possible to apply more detail contrast if the noise low, and lower detail contrast in the opposite case, in order to avoid over-enhancement of noise. The noise level $\sigma_{0n}$ is estimated as described sub 3b.

$$G_d = G_{d0} \cdot \left(\frac{\sigma_{0T}}{\sigma_{0n} \cdot G_p}\right)^{P_{sn}},$$

wherein $G_{d0}$ is a predefined basic small-scale contrast amplification factor, $\sigma_{0T}$ is a predefined target noise level, $G_p$ is the image normalization factor as determined sub 3, and $P_{sn}$ is a predefined parameter in the range [0,1] that specifies to which extent the contrast amplification has to be adjusted as a function of the noise level. If $P_{sn}$ is zero, then no adjustment takes place, and $G_d=G_{d0}$. In the other extreme case, $P_{sn}$ is one, then detail contrast amplification is inversely proportional to the noise level of the normalized image. Preferably, $P_{sn}$ should be in the range [0.1,0.5]. The preferred settings for target noise level $\sigma_{0T}$ and the basic small-scale contrast amplification factor $G_{d0}$ depend on the combined gain factors throughout the processing chain, and must be determined experimentally. $G_{d0}$ should be in the same order of magnitude as the large-scale gradient average. The target noise level can be determined by selecting an arbitrary image that was created with appropriate exposure dose, and setting $\sigma_{OT}$ equal to the actual noise level $\sigma_{On} \cdot G_p$ of that image. With such settings, any subsequent image having a higher noise level will be processed with lower detail contrast enhancement and vice versa, in accordance with the findings of the present invention.

7. Intermediate-scale Gradient Functions

Given a large scale gradient function $gm_L(t)$ at a scale L as defined sub 5, and a small-scale gradient function $gm_S(t)$ that applies to the smaller scales from 0 through S as defined sub 6, then the gradient functions at the intermediate scales from S+1 through L−1 are generated according to the following preferred embodiment:

$$gm_k(t) = gm_S(t) \cdot \left( \frac{gm_L(t)}{gm_S(t)} \right)^{\frac{k-S}{L-S}},$$

$k=S+1, S+2, \ldots, L-1$

This specification of the intermediate scale gradient functions ensures a gradual transition from the large-scale gradient function to the small-scale gradient function. As a consequence, the contrast behaviour evolves gradually from the large-scale contrast behaviour specified by $gm_L(t)$, to the detail contrast behaviour specified by $gm_S(t)$.

Figure 11:
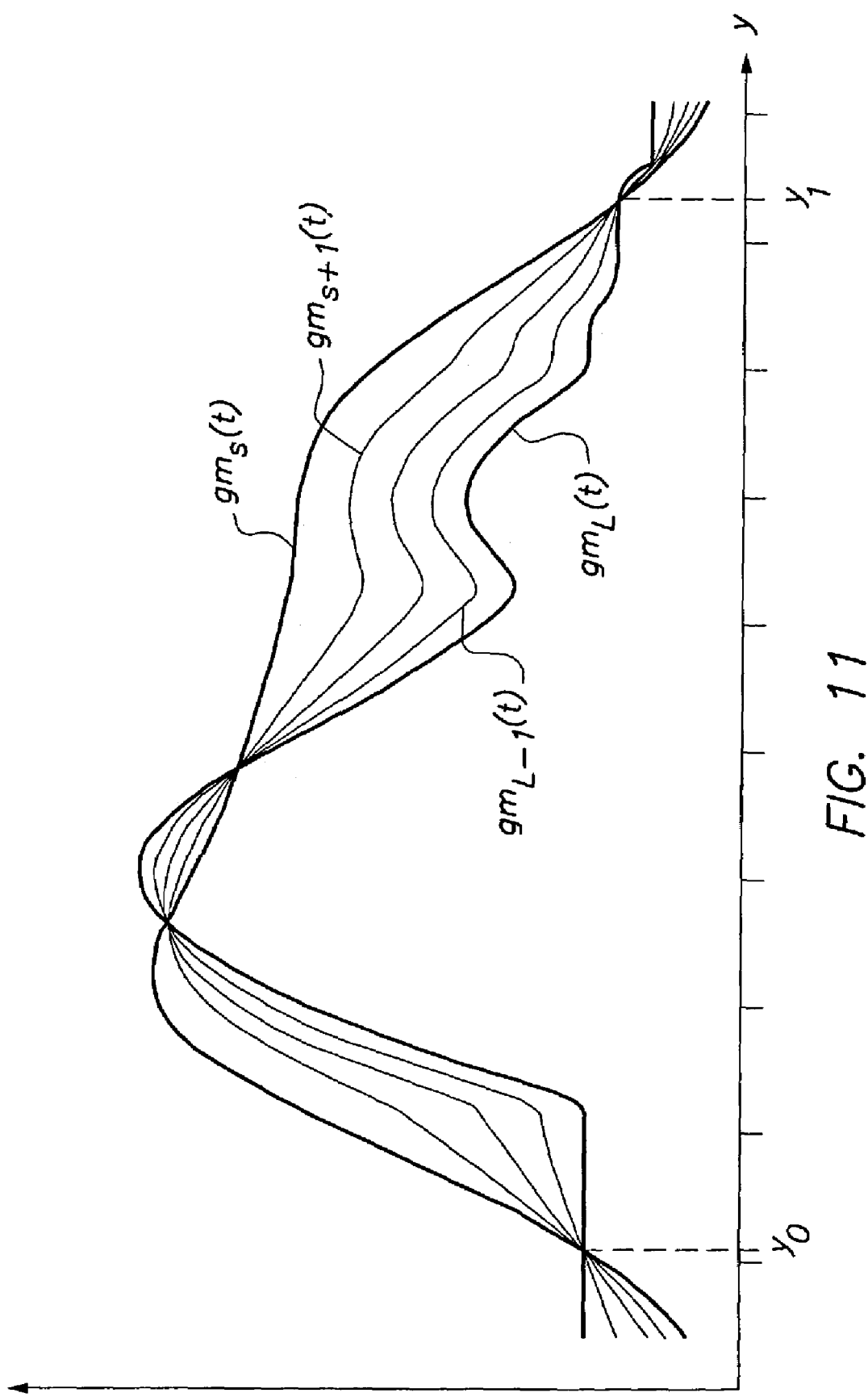
FIG. 11 shows the scale-specific gradients at large, intermediate and small scales, as a function of density.

In a preferred embodiment, the large scale parameter S is preferably set within the range [0, 4], and L should preferably be in the range $[S+2, k_{max}-1]$, where $k_{max}$ is the largest scale of the multiscale decomposition. In case the image dimensions are 2048×2048, most preferable settings are S=3 and L=7. In that case, the scales is 0, 1, 2 and 3 are controlled by the same small-scale gradient function $gm_S(t)$, the large scale gradient function applies to scale 7, and a gradual transition is provided from scale 4 through scale 6. An example of a series of these functions is illustrated in FIG. 11

I claim:

1. A method of generating a contrast enhanced version of a gray value image comprising applying contrast amplification to a multiscale representation of said image, said multiscale representation representing image detail at different scales, wherein the density in the contrast enhanced version as a function of grey value and the contrast amplification are specified independently, wherein said contrast amplification is specified at successive scales by a series of gradient functions that represent the amount of contrast amplification as a function of gray value at the corresponding scale, and wherein a gradient function for a predefined large scale among said scales is derived from the specified density as a function of gray value.

2. The method according to claim 1 wherein a gradient function for a predefined large scale among said scales is the derivative of a predefined gradation function that specifies density as function of grey value.

3. The method according to claim 2 wherein said large-scale gradation function has a predefined ordinate value and a predefined slope in an anchor point, the abscissa value of the anchor point being deduced from a digital image representation of said grey value image or of a large-scale image obtained by applying partial reconstruction to said multi-scale representation.

4. The method according to claim 2 wherein said large-scale gradation function has a predefined shape, and is stretched and shifted along the abscissa axis in order to match a relevant subrange of pixel values of said gray value image or of a large-scale image obtained by applying partial reconstruction to said multiscale representation.

5. The method according to claim 2 wherein said large-scale gradation function is derived from the histogram of pixel values of said gray value image or of a large-scale image obtained by applying partial reconstruction to said multiscale representation.

6. The method according to claim 5 in which said large-scale gradation function is further adjusted so that it has a predefined ordinate value in at least one anchor point, the abscissa of which is determined as a characteristic point of the histogram of pixel values of said gray value image or of a large-scale image obtained by applying partial reconstruction to said multiscale representation.

7. The method according to claim 1 wherein said contrast amplification is specified at successive scales by a series of gradient functions that represent the amount of contrast amplification as a function of value at the corresponding scale, wherein a gradient function for a predefined large scale among said scales is derived from the histogram of the pixel values of said gray value image or from the histogram of pixel values of a large scale image obtained by applying partial reconstruction to said multiscale representation.

8. The method according to claim 1 wherein said contrast amplification is specified at successive scales by a series of gradient functions that represent the amount of contrast amplification as a function of gray value at the corresponding scale, wherein the gradient functions at the smaller scales larger than a predefined large scale are derived from the specified contrast amplification.

9. The method according to claim 8 wherein the contrast amplification is specified by a predefined gradient function at a predefined small scale.

10. The method according to claim 9 wherein said gradient function at said predefined small scale has a predefined value in each of at least two overlapping gray value bands.

11. The method according to claim 10 wherein said gradient function at said predefined small scale depends on a gradient function at a predefined large scale.

12. The method according to claim 9 wherein said gradient function at said predefined small scale depends on a gradient function at a predefined large scale.

13. The method according to claim 9 wherein said predefined gradient function for said small scale is expressed as a function of density.

14. The method according to claim 9 modified so that the small-scale gradient function is adjusted as a function of the signal-to-noise ratio of the original digital image.

15. The method according to claim 14 wherein gradient functions at the scales smaller than said small-scale are identical to the gradient function for said small scale.

16. The method according to claim 9 wherein gradient functions at the scales smaller than said small-scale are identical to the gradient function for said small scale.

17. The method according to claim 1 in which gradient functions for intermediate scales in between said large scale and a predefined small scale have a shape that evolves gradually from the shape of the gradient function for said large scale to the shape of a gradient function for said predefined small scale.

18. The method according to claim 17 in which the gradient functions $gm_k(\ )$ at intermediate scales k are defined by:

$$gm_k() = gm_S() \cdot \left(\frac{gm_L()}{gm_S()}\right)^{\frac{k-S}{L-S}},$$

wherein $gm_L()$ is said large-scale gradient function at scale L, $gm_S()$ is said small-scale gradient function at scale S, and S<k<L.

19. The method according to claim 1 in which one or more of the scale-specific gradient functions or scale-specific conversion functions are stored as lookup tables.

20. The method according to claim 1 in which said multiscale representation is a Burt pyramid, a multiresolution subband representation or a wavelet representation.

21. The method according to claim 1 in which said gray value image is a medical image.

22. The method according to claim 1 in which said medical image is a digital X-ray image.

23. A computer program embodied in a computer readable medium for facilitating performing the step of applying contrast amplification to a multiscale representation of said image, said multiscale representation representing image detail at different scales, wherein the density in the contrast enhanced version as a function of grey value and the contrast amplification are specified independently, wherein said contrast amplification is specified at successive scales by a series of gradient functions that represent the amount of contrast amplification as a function of gray value at the corresponding scale, and wherein a gradient function for a predefined large scale among said scales is derived from the specified density as a function of gray value.

24. A computer readable medium comprising computer executable instructions for facilitating performing the step of applying contrast amplification to a multiscale representation of said image, said multiscale representation representing image detail at different scales, wherein the density in the contrast enhanced version as a function of grey value and the contrast amplification are specified independently, wherein said contrast amplification is specified at successive scales by a series of gradient functions that represent the amount of contrast amplification as a function of gray value at the corresponding scale, and wherein a gradient function for a predefined large scale among said scales is derived from the specified density as a function of gray value.

25. A method of generating a contrast enhanced version of a grey value image by applying contrast amplification to a multiscale representation of said image, said multiscale representation representing image detail at different scales, wherein the density in the contrast enhanced version as a function of grey value and the contrast amplification are specified independently, said contrast amplification is specified at successive scales by a series of gradient functions that represent the amount of contrast amplification as a function of value at the corresponding scale, and wherein a gradient function for a predefined large scale among said scales is derived from the histogram of the pixel values of said gray value image or from the histogram of pixel values of a large scale image obtained by applying partial reconstruction to said multiscale representation.

26. A method of generating a contrast enhanced version of a grey value image by applying contrast amplification to a multiscale representation of said image, said multiscale representation representing image detail at different scales, wherein the density in the contrast enhanced version as a function of grey value and the contrast amplification are specified independently, wherein said contrast amplification is specified at successive scales by a series of gradient functions that represent the amount of contrast amplification as a function of gray value at the corresponding scale, and wherein the gradient functions at the smaller scales larger than a predefined large scale are derived from the specified contrast amplification.

* * * * *